US011063857B2

(12) United States Patent
Tewari et al.

(10) Patent No.: US 11,063,857 B2
(45) Date of Patent: Jul. 13, 2021

(54) MONITORING CONNECTIVITY AND LATENCY OF A VIRTUAL NETWORK

(71) Applicant: Microsoft Technology Licensing, LLC, Redmond, WA (US)

(72) Inventors: Rishabh Tewari, Sammamish, WA (US); Daniel Firestone, Seattle, WA (US); Harish Kumar Chandrappa, Bothell, WA (US); Anitha Adusumilli, Sammamish, WA (US); David Michael Brumley, Bellevue, WA (US); Deepak Bansal, Bellevue, WA (US); Albert Gordon Greenberg, Seattle, WA (US); Parag Sharma, Issaquah, WA (US); Arjun Roy, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 73 days.

(21) Appl. No.: 16/198,732

(22) Filed: Nov. 21, 2018

(65) Prior Publication Data
US 2019/0363965 A1 Nov. 28, 2019

Related U.S. Application Data

(60) Provisional application No. 62/676,914, filed on May 25, 2018.

(51) Int. Cl.
*H04L 12/26* (2006.01)
*G06F 9/455* (2018.01)
(Continued)

(52) U.S. Cl.
CPC .......... *H04L 43/10* (2013.01); *G06F 9/45558* (2013.01); *H04L 41/046* (2013.01);
(Continued)

(58) Field of Classification Search
CPC ......... H04L 12/56; H04L 29/06; H04L 12/26; H04L 12/85; H04L 41/046; H04L 43/028;
(Continued)

(56) References Cited

U.S. PATENT DOCUMENTS

| 5,710,885 A * | 1/1998 | Bondi ..................... H04L 41/12 709/224 |
| 6,681,232 B1 | 1/2004 | Sistanizadeh et al. |

(Continued)

FOREIGN PATENT DOCUMENTS

| EP | 1891784 B1 | 5/2014 |
| EP | 3151467 A1 | 4/2017 |

OTHER PUBLICATIONS

Dooho Choi, "Information Security Applications", Mar. 29, 2017, Springer, 1st edition, pp. 148-149 (Year: 2017).*

(Continued)

*Primary Examiner* — Thomas J Dailey
(74) *Attorney, Agent, or Firm* — Newport IP, LLC; Han Gim

(57) ABSTRACT

Techniques are described herein that are capable of monitoring connectivity and latency of network links in virtual networks. For instance, a ping agent injects first ping packets into network traffic on behalf of hosts in the virtual network. The ping agent monitors incoming packets to identify first ping response packets, which are in response to the first ping packets, among the incoming packets. A ping responder rule that is included in inbound packet filter rules for a port in a virtual switch intercepts second ping packets in the network traffic. The ping responder rule converts the second ping packets into second ping response packets and injects the second ping response packets into outbound packet filter rules to be transferred to sources from which the second ping packets are received.

24 Claims, 7 Drawing Sheets

(51) Int. Cl.
  *H04L 12/24* (2006.01)
  *G06F 9/48* (2006.01)
(52) U.S. Cl.
  CPC ........ *H04L 43/028* (2013.01); *H04L 43/0811* (2013.01); *H04L 43/0841* (2013.01); *H04L 43/0864* (2013.01); *G06F 9/4856* (2013.01); *G06F 2009/45595* (2013.01)
(58) Field of Classification Search
  CPC ............. H04L 43/0811; H04L 43/0841; H04L 43/0864; H04L 43/10; G06F 21/55; G06F 17/00; G06F 9/45558; G06F 9/4856; G06F 2009/45595
  See application file for complete search history.

(56) References Cited

U.S. PATENT DOCUMENTS

| | | | |
|---|---|---|---|
| 10,187,309 B1 * | 1/2019 | Vincent | H04L 47/11 |
| 2007/0153676 A1 * | 7/2007 | Baglin | H04W 24/04 |
| | | | 370/216 |
| 2007/0288545 A1 | 12/2007 | Komlenic et al. | |
| 2008/0031265 A1 * | 2/2008 | Mullick | H04L 12/4641 |
| | | | 370/401 |
| 2010/0154049 A1 * | 6/2010 | Yoshimi | H04L 63/02 |
| | | | 726/13 |
| 2011/0072129 A1 * | 3/2011 | Le Pennec | H04L 67/28 |
| | | | 709/224 |
| 2012/0151068 A1 * | 6/2012 | Su | H04L 43/10 |
| | | | 709/227 |
| 2015/0319270 A1 * | 11/2015 | Roeland | H04L 61/2007 |
| | | | 370/254 |
| 2017/0286236 A1 * | 10/2017 | Protasov | G06F 16/184 |
| 2017/0324628 A1 * | 11/2017 | Dhanabalan | H04L 47/24 |
| 2018/0295144 A1 * | 10/2018 | Jackson | G06F 21/554 |

OTHER PUBLICATIONS

"International Search Report and Written Opinion Issued in PCT Application No. PCT/US19/031943", dated Aug. 14, 2019, 13 Pages.

* cited by examiner

MONITORING CONNECTIVITY AND LATENCY OF A VIRTUAL NETWORK

CROSS-REFERENCE TO RELATED APPLICATION(S)

This application claims the benefit of U.S. Provisional Application No. 62/676,914, filed May 25, 2018 and entitled "Vnet Pingmesh: Continuous Monitoring of Connectivity and Latency in Virtual Networks," the entirety of which is incorporated by reference herein.

BACKGROUND

A virtual network is a computer network in which one or more hosts are isolated from communicating with one or more other hosts on a common (e.g., same) physical network. Each host in the virtual network may be a virtual host or a physical host. Isolation between the hosts in the virtual network may be achieved using packet filtering, encapsulation, or other mechanisms. Many virtual networks can co-exist on the same physical network. Within a single virtual network, hosts may be limited in communication by network policies that restrict communication to specific ports or protocols. Virtual networks also may be peered, allowing communication across virtual networks.

Each user or group of users of a virtual network may utilize its own customer addresses (CAs) for the hosts in the virtual network. Because users may choose the same or overlapping address spaces, the customer addresses (CAs) therein are not necessarily unique. Because unique addresses are required to route packets through the physical network, the virtual network maps the CAs to unique platform addresses (PAs), which are used for routing in the physical network. Mapping may be performed using a variety of techniques. For example, the CAs in outgoing packets may be re-written to PAs on the source, and then the PAs may be re-written back to the associated CAs on the destination. In another example, each original packet with source and destination CAs may be encapsulated inside an outer packet with source and destination PAs. The outer packet may be removed (a.k.a. decapped) before the packet is delivered to the destination host. The encapsulated packet may contain a virtual network identifier that can be used as an additional filter condition so that packets within one virtual network cannot be delivered to hosts in another virtual network.

However, conventional virtual networks often require relatively complex configuration and packet processing, as compared to physical networks. Such complexity may result in the virtual networks having more connectivity and/or latency issues. These issues may be exacerbated if a virtual network is misconfigured.

SUMMARY

Various approaches are described herein for, among other things, monitoring (e.g., actively monitoring) connectivity and latency of a virtual network. For instance, to provide monitoring (e.g., continuous monitoring) of the control plane for a virtual network, a ping agent (e.g., virtual network agent) can inject (e.g., continuously inject) ping packets between hosts in the virtual network. Examples of a host include but are not limited to virtual machine, a container, a function, and a physical machine (e.g., a non-virtual server. In one example, the ping agent may be a network management agent. For instance, the network management agent may program the virtual layers associated with the virtual network. In another example, the ping agent may be separate from (e.g., a different process from) the network management agent. The ping agent may record the success or failure of each ping, as well as the round-trip-time latency. The ping agent may report the data to a monitoring system for alerting of individual link health, aggregate virtual network health, and/or aggregate cluster health. This may provide near real-time monitoring of connectivity and latency of the connections between hosts in the virtual network. The monitoring data can be used to detect failures of the virtual network during software deployments (e.g., in order to initiate rapid rollback) and/or to continuously monitor the health of the virtual network in a cloud environment and allow pro-active investigation before customers of the virtual network detect or report issues.

In an example approach, a ping agent injects first ping packets into network traffic on behalf of hosts in the virtual network. The ping agent monitors incoming packets to identify first ping response packets, which are in response to the first ping packets, among the incoming packets. A ping responder rule that is included in inbound packet filter rules for a port in a virtual switch intercepts second ping packets in the network traffic. The ping responder rule converts the second ping packets into second ping response packets and injects the second ping response packets into outbound packet filter rules to be transferred to sources from which the second ping packets are received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
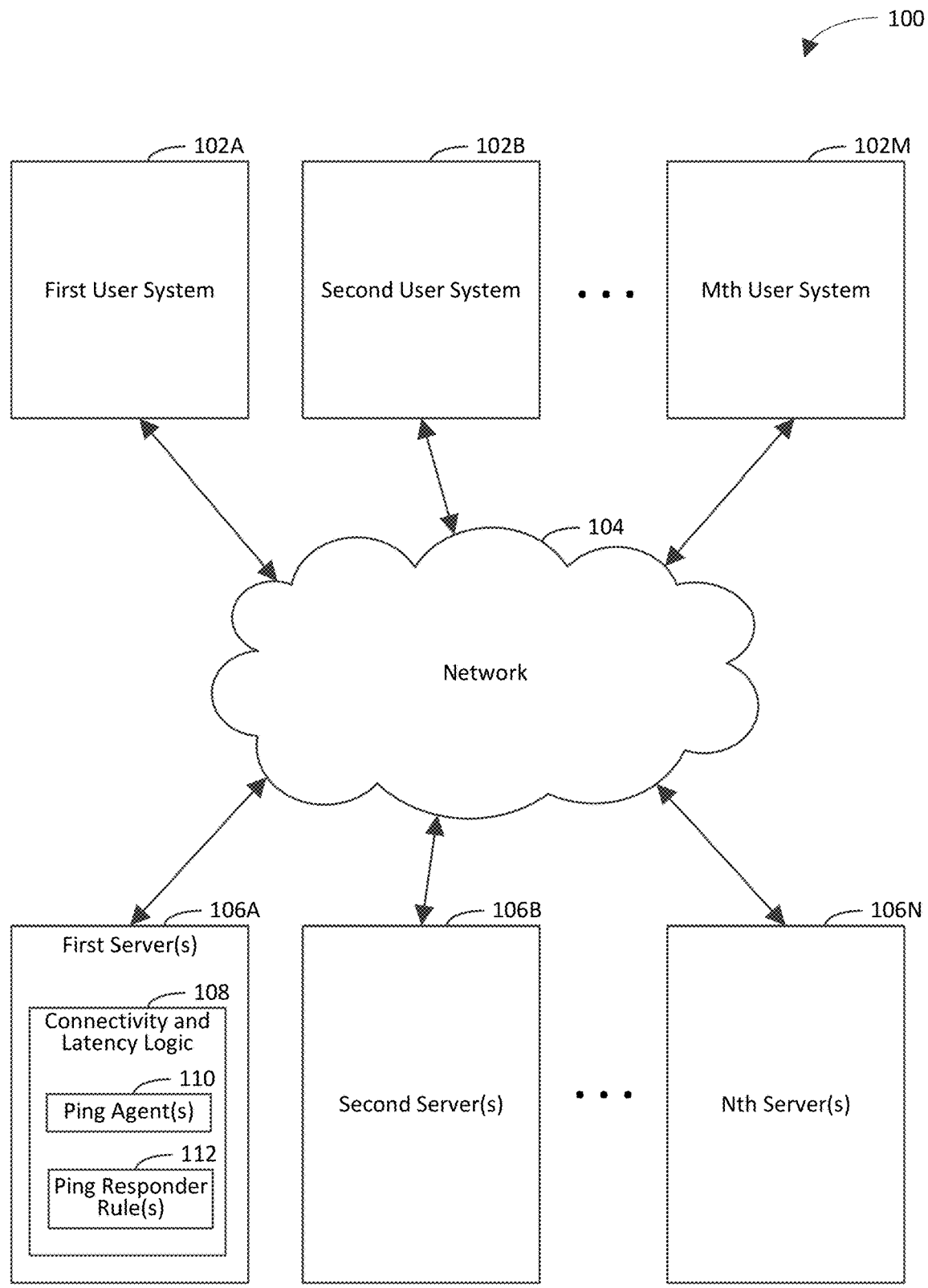
FIGS. 1 and 2 are block diagrams of example virtual networking ping systems in accordance with embodiments.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an

DETAILED DESCRIPTION

I. Introduction

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

II. Example Embodiments

Example embodiments described herein are capable of monitoring (e.g., actively monitoring) connectivity and latency of a virtual network. For instance, to provide monitoring (e.g., continuous monitoring) of the control plane for a virtual network, a ping agent (e.g., virtual network agent) can inject (e.g., continuously inject) ping packets between hosts in the virtual network. Examples of a host include but are not limited to virtual machine, a container, a function, and a physical machine (e.g., a non-virtual server). In one example, the ping agent may be a network management agent. For instance, the network management agent may program the virtual layers associated with the virtual network. In another example, the ping agent may be separate from (e.g., a different process from) the network management agent. The ping agent may record the success or failure of each ping, as well as the round-trip-time latency. The ping agent may report the data to a monitoring system for alerting of individual link health, aggregate virtual network health, and/or aggregate cluster health. This may provide near real-time monitoring of connectivity and latency of the connections between hosts in the virtual network. The monitoring data can be used to detect failures of the virtual network during software deployments (e.g., in order to initiate rapid rollback) and/or to continuously monitor the health of the virtual network in a cloud environment and allow pro-active investigation before customers of the virtual network detect or report issues.

Example techniques described herein have a variety of benefits as compared to conventional techniques for providing a virtual network. For instance, the example techniques may reduce latency and/or increase connectivity of a virtual network. High latency often precedes network connectivity failures and packet drops. Accordingly, monitoring latency may facilitate discovery and mitigation of imminent connectivity failures. As virtual networks evolve, new packet filtering and transform rules may be added. If a new rule causes an unexpected increase in latency, the example techniques may detect this latency. The example techniques may use a designated (e.g., special) packet filtering rule (e.g., ping responder rules) to intercept ping packets at the destination, before reaching virtual machine (VM) network interfaces. The example techniques may automatically inject ping response packets in response to the ping packets. Intercepting the ping packets and/or automatically injecting the ping response packets may enable critical networking layers (virtual network and physical network) to be monitored without requiring a customer to install and run a ping agent or any other special software or configuration on the user's VMs or even for VMs to be running. The example techniques may use designated (e.g., special) TCP SYN and TCP SYN-ACK packets with a bit pattern in the TCP Options header to identify virtual network ping packets and filter and return them within the virtual network switch. For example, TCP option 250 may be used. In another example, the bit pattern may be a unique bit pattern (e.g., a signature, such as a magic number) that uniquely identifies the virtual network ping packets. The bit pattern may include any suitable number of bits (e.g., 64 or 128). It may be desirable for a bit pattern to be selected that is unlikely to occur in normal (non-ping) TCP SYN packets in the virtual network.

The example techniques may use a ping agent to continuously inject ping packets, collect ping responses, and continuously report networking ping data in near real-time (e.g., 1 minute latency) to a monitoring and alerting system. The monitoring and alerting system may aggregate ping data at the link, VM, node, rack, cluster, and/or region level. The monitoring and alerting system may generate alerts if network connectivity drops or latency spikes. These alerts can trigger manual operator intervention or automatic mitigation procedures. The example techniques may monitor connectivity and latency of the virtual network and connectivity and latency of the underlying physical network (e.g., caused by saturated or failing physical links or switching devices).

The example techniques may be used as an internal monitoring system for a cloud computing program (e.g., Azure Networking with NMAgent). The cloud computing program may provide infrastructure as a service (IaaS), platform as a service (PaaS), and/or software as a service (SaaS) services to the users. Examples of a cloud computing program include but are not limited to Google Cloud® developed and distributed by Google Inc., Oracle Cloud® developed and distributed by Oracle Corporation, Amazon Web Services® developed and distributed by Amazon.com, Inc., Salesforce® developed and distributed by Salesforce.com, Inc., AppSource® developed and distributed by Microsoft Corporation, Azure® developed and distributed by Microsoft Corporation, GoDaddy® developed and distributed by GoDaddy.com LLC, and Rackspace® developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The example techniques may improve performance of a computing system that monitors a virtual network. For instance, the example techniques may reduce an amount of time and/or resources (e.g., memory, processor cycles, network bandwidth) that is consumed to monitor a virtual network. The example techniques may increase efficiency of a computing system that is used to monitor a virtual network. The example techniques may increase user efficiency (e.g., efficiency of an administrator who oversees a computer network). For example, by intercepting the ping packets and/or automatically injecting the ping response packets as described herein, the example techniques may reduce a number of steps that are performed by an administrator, an amount of effort that the administrator expends, and/or an amount of time that the administrator takes to oversee the computer system.

FIG. 1 is a block diagram of an example virtual networking ping system 100 in accordance with an embodiment. Generally speaking, virtual networking system 100 operates to provide information to users (e.g., software engineers, application developers, etc.) in response to requests (e.g., hypertext transfer protocol (HTTP) requests) that are received from the users. The information may include documents (e.g., Web pages, images, audio files, video files, etc.), output of executables, and/or any other suitable type of information. In accordance with example embodiments described herein, virtual networking system 100 monitors connectivity and latency between hosts in a virtual network. Virtual networking system 100 may be capable of detecting failures in the underlying physical network, though the example embodiments are not limited in this respect. In some aspects, the ability to detect failures in the underlying physical network may be equally important to detecting network failures in the virtual network layers.

As shown in FIG. 1, virtual networking system 100 includes a plurality of user systems 102A-102M, a network 104, and a plurality of servers 106A-106N. Communication among user systems 102A-102M and servers 106A-106N is carried out over network 104 using well-known network communication protocols. Network 104 may be a wide-area network (e.g., the Internet), a local area network (LAN), another type of network, or a combination thereof.

User systems 102A-102M are processing systems that are capable of communicating with servers 106A-106N. An example of a processing system is a system that includes at least one processor that is capable of manipulating data in accordance with a set of instructions. For instance, a processing system may be a computer, a personal digital assistant, etc. User systems 102A-102M are configured to provide requests to servers 106A-106N for requesting information stored on (or otherwise accessible via) servers 106A-106N. For instance, a user may initiate a request for executing a computer program (e.g., an application) using a client (e.g., a Web browser, Web crawler, or other type of client) deployed on a user system 102 that is owned by or otherwise accessible to the user. In accordance with some example embodiments, user systems 102A-102M are capable of accessing domains (e.g., Web sites) hosted by servers 106A-106N, so that user systems 102A-102M may access information that is available via the domains. Such domain may include Web pages, which may be provided as hypertext markup language (HTML) documents and objects (e.g., files) that are linked therein, for example.

Each of user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more user systems 102A-102M may communicate with any one or more servers 106A-106N.

Servers 106A-106N are processing systems that are capable of communicating with user systems 102A-102M. Servers 106A-106N are configured to execute computer programs that provide information to users in response to receiving requests from the users. For example, the information may include documents (e.g., Web pages, images, audio files, video files, etc.), output of executables, or any other suitable type of information. In accordance with some example embodiments, servers 106A-106N are configured to host respective Web sites, so that the Web sites are accessible to users of virtual networking ping system 100.

First server(s) 106A is shown to include connectivity and latency logic 108 for illustrative purposes. Connectivity and latency logic 108 is configured to monitor connectivity and latency of one or more virtual networks. Connectivity and latency logic 108 includes ping agent(s) 110 and ping responder rule(s) 112. Each of the ping agent(s) 108 injects outgoing ping packets into network traffic on behalf of host(s) in a virtual network. Each of the ping agent(s) 110 also monitors incoming packets to identify incoming ping response packets therein. The incoming ping response packets are received in response to the outgoing ping packets. Ping agent(s) 110 run externally to hosts in the virtual network. Each of the responder rule(s) 112 is included in inbound packet filter rules for a port in a virtual switch. Each of the responder rule(s) 112 intercepts incoming ping packets, which were injected by one or more of the ping agent(s) 110, in the network traffic. Each of the responder rule(s) 112 converts the respective incoming ping packets into respective outgoing ping response packets and injects the respective outgoing ping response packets into outbound packet filter rules to be transferred toward the hosts from which the respective incoming ping packets are received. It should be noted that ping packets received from a ping agent acting on behalf of a host are said to be received from the host.

It may be said that ping agent(s) 110 and ping responder rule(s) 112 collaborate to monitor the various links between the hosts in the virtual network. To monitor the status of a link between two hosts (e.g., a "source host" and a "destination host") in the virtual network, a ping agent associated with the source host (e.g., source virtual machine) may inject a ping packet with a source address of the source host and a destination address of the destination host (e.g., destination virtual machine) into a port of a virtual switch that is associated with the source host. When the ping packet arrives at the destination host, assuming it is not lost in transit due to a misconfiguration or a failure of the virtual network or the physical network across which the virtual network overlays, a ping responder rule on a port of a virtual switch that is associated with the destination host intercepts the ping packet before the ping packet can be delivered to the destination host. Because the source ping agent runs externally to the source host and the ping packet is intercepted before entering the destination host, the source and destination hosts need not necessarily be listening for ping packets or even running in order for connectivity and latency in the virtual network to be monitored in accordance with the techniques described herein. Accordingly, links in the virtual network may be monitored without being affected by the state of the source or destination hosts. The ping responder rule that intercepts the ping packet may swap the source and destination addresses of the ping packet to generate a ping response packet, which is then sent to the source host. Accordingly, it may be said that the ping responder rule causes the ping packet to "bounce" off the destination host's virtual NIC.

Connectivity and latency logic 108 may be implemented in various ways to monitor connectivity and latency of a virtual network, including being implemented in hardware, software, firmware, or any combination thereof. For example, at least a portion of connectivity and latency logic 108 may be implemented as computer program code configured to be executed in one or more processors. In another example, at least a portion of connectivity and latency logic 108 may be implemented as hardware logic/electrical circuitry. For instance, at least a portion of connectivity and latency logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Connectivity and latency logic 108 is shown to be incorporated in first server(s) 106A for illustrative purposes and is not intended to be limiting. It will be recognized that connectivity and latency logic 108 (or any portion(s) thereof) may be incorporated in any one or more of the user systems 102A-102M. For example, client-side aspects of connectivity and latency logic 108 may be incorporated in one or more of the user systems 102A-102M, and server-side aspects of connectivity and latency logic 108 may be incorporated in first server(s) 106A. In another example, connectivity and latency logic 108 may be distributed among the user systems 102A-102M. In another example, connectivity and latency logic 108 may be distributed among the server(s) 106A-106N. In still another example, connectivity and latency logic 108 may be incorporated in a single one of the server(s) 106A-106N.

Figure 2:
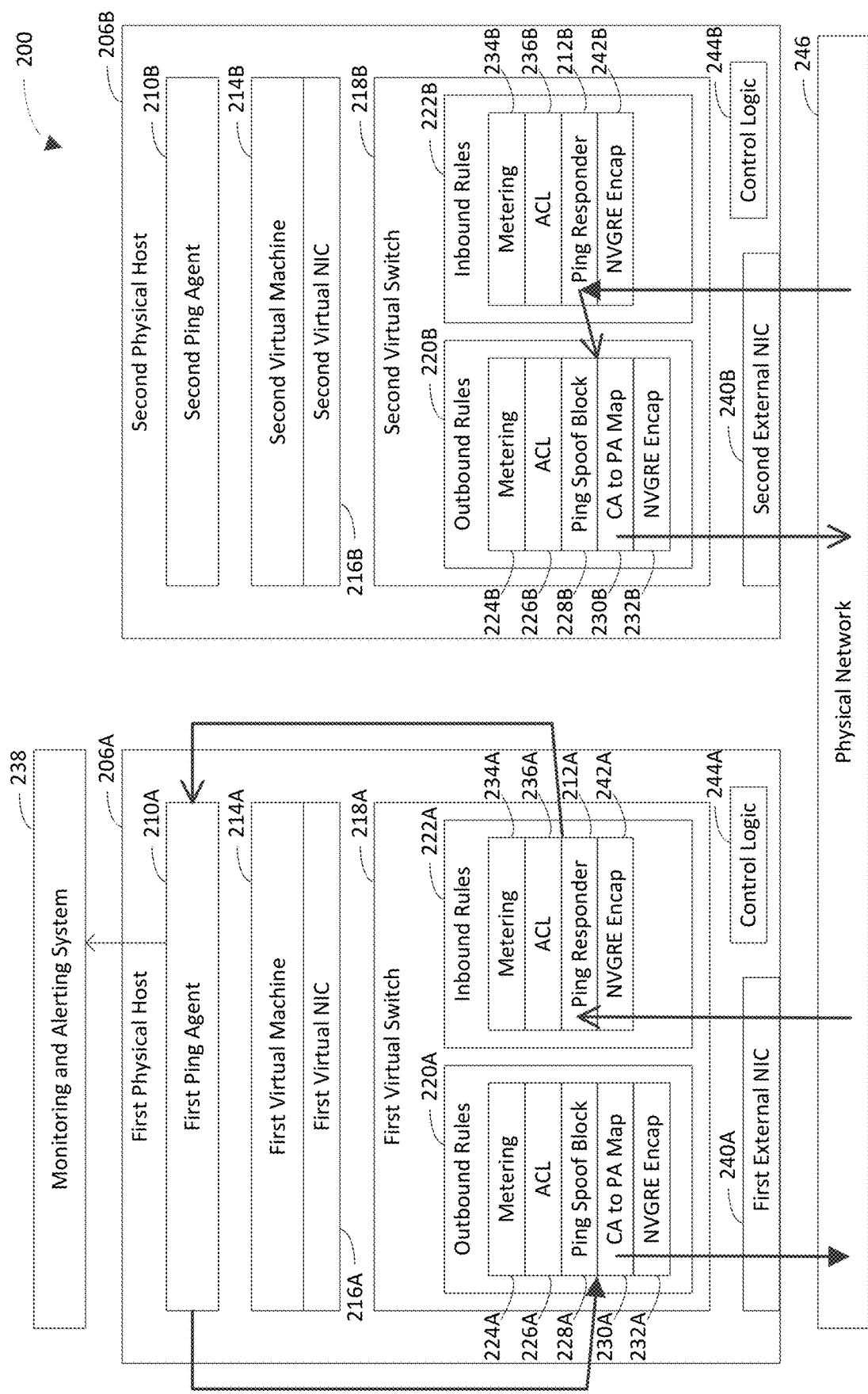

FIG. 2 is a block diagram of another example virtual networking ping system 200 in accordance with an embodiment. As shown in FIG. 2, virtual networking ping system 200 includes a first physical host 206A, a second physical host 206B, a monitoring and alerting system 238, and a physical network 246. For purposes of illustration, first physical host 206A is shown in FIG. 2 to provide ping packets to second physical host 206B via physical network 246, and second physical host 206B is shown to provide ping response packets to first physical host 206A via physical network 246 in response to receipt of the respective ping packets from first physical host 206A. In practice, the ping packets and the ping response packets are actually transferred between hosts that are hosted on the first and second physical hosts 206A and 206B via a virtual network that overlays across physical network 246. The flow of the ping packets is depicted using arrows with solid heads, and the flow of the ping response packets is depicted using arrows with large open heads, as indicated in the legend of FIG. 2. Further detail regarding the generation and functionality of the ping packets and the ping response packets will be provided in the following discussion.

First physical host 206A includes a first ping agent 210A, a first virtual machine 214A, a first virtual network interface controller (NIC) 216A, a first virtual switch 218A, a first external NIC 240A, and control logic 244A. First ping agent 210A is configured to inject ping packets on behalf of virtual network hosts (e.g., first virtual machine 214A) and record both successful ping responses and timeouts to monitoring and alerting system 238. First ping agent 210A is aware of the source addresses for VMs (e.g., first virtual machine 214A) on first physical host 206A and the destination addresses for all other VMs (e.g., second virtual machine 214B) in the virtual network. First ping agent 210A is able to identify the ports of virtual switches (e.g., first virtual switch 218A) for VM NICs (e.g., first virtual NIC 216A).

First ping agent 210A is further able to inject ping packets and intercept ping response packets on such ports. First ping agent 210A may be able to receive updates for mappings of the virtual network (e.g., mappings between CAs and PAs of the virtual network) and updates when VMs are created or removed on first physical host 206A.

First virtual machine 214A is an emulation of a computer system. Accordingly, first virtual machine 214A may provide functionality of a physical computer. First virtual NIC 216A is an emulation of a physical NIC. A physical NIC is a computer hardware component that connects a computer to a computer network. Accordingly, first virtual NIC 216A connects first virtual machine 214A to the virtual network.

First virtual switch 218A is an emulation of a physical network switch. A physical network switch is a computer networking device that connects source and destination hosts together on a computer network by using packet switching to receive, process, and forward data to the destination host. Accordingly, first virtual switch 218A connects first virtual machine 214A to other host(s) (e.g., second virtual machine 214B) on the virtual network by using packet switching (a) to provide ping packets to those host(s) and to receive ping response packets from those host(s) and/or (b) to receive ping packets from those host(s) and to provide ping response packets to those host(s). First virtual switch 218A may be a feature of a hypervisor that is included in an operating system that runs on first virtual machine 214A. The hypervisor may be an abstraction layer on top of the operating system that intercepts system calls (e.g., calls for disk access, networking access, and memory access) from first virtual machine 214A. First virtual switch 218A may be configured to enable multiple virtual machines to run on top of first physical host 206A, and the multiple virtual machines may share first external NIC 240A. First virtual switch 218A may isolate calls from the virtual machines such that the virtual machines cannot see each other's traffic.

First virtual switch 218A includes outbound rules 220A and inbound rules 222A. Outbound rules 220A and inbound rules 222A are packet filter rules that implement network policies for first virtual machine 214A. Packet filter rules are rules that can match packets based on satisfaction of one or more criteria. Upon matching a packet, the packet filter rules may either drop the packet or apply transform(s) to the packet. For each virtual machine hosted in a hypervisor, the corresponding virtual NIC may be associated with a port in a virtual switch (VSwitch), and each port may have both inbound and outbound packet filter rules (as shown in FIG. 2) that implement the network policies for the virtual network of which the virtual machine is a member. The inbound and outbound packet filter rules may provide isolation for customer virtual machines. For physical hosts external to a hypervisor, the packet filtering and transforms necessary to implement virtual network policies may be performed by a default router.

Outbound rules 220A include metering rules 224A, access control list (ACL) rules 226A, a ping spoof block rule 228A, a CA-to-PA map rule 230A, a network virtualization using generic routing encapsulation (NVGRE) encapsulation rule 232A. The metering rules 224A define fees to be billed to users of the virtual network for bandwidth utilization in the virtual network. The ACL rules 226A define permissions associated with packets. For instance, the ACL rules 226A may specify which users and/or system processes are granted access to the packets and/or which operations are allowed to be performed on which objects. The ping spoof block rule 228A blocks hosts from sending spoof ping packets, which might interfere with proper operation of first ping agent 210A. The CA-to-PA map rule 230A defines a mapping between customer addresses (CAs) and platform addresses (PAs) for hosts in the virtual network. The NVGRE encapsulation rule 232A defines how packets are to be encapsulated prior to being provided to the virtual network.

Inbound rules 222A include metering rules 234A, ACL rules 236A, a ping responder rule 212A, and a NVGRE encapsulation rule 242A. The metering rule 234A, the ACL rule 236A, and the NVGRE encapsulation rule 242A are operable in a manner similar to the metering rule 224A, the ACL rule 226A, and the NVGRE encapsulation rule 232A in outbound rules 220, except that the NVGRE encapsulation rule 242A defines how packets are to be decapsulated upon receipt from the virtual network. The ping responder rule 212A is able to intercept ping response packets from the virtual network. For instance, the ping responder rule 212A may prevent the ping response packets from reaching first virtual machine 214A. The ping responder rule 212A is able to convert the ping packets into ping response packets and to provide those ping response packets to sources of the ping packets from which the ping response packets are generated. It will be recognized that the ping responder rule 212A may run in the kernel of the operating system of virtual machine 214A, rather than as a user process. Accordingly, the ping responder rule 212A need not necessarily cause a context switch within the host processor, which may reduce processor overhead associated with monitoring the virtual network.

First external NIC 240A is a physical NIC that connects first physical host 206A to physical network 246. Control logic 244A may be capable of controlling operability of first ping agent 210A, one or more of the outbound rules 220A, and/or one or more of the inbound rules 222A (e.g., ping responder rule 212A). Control logic 244A may be capable of enabling a user to define a priority of subnets in the virtual network for purposes of monitoring connectivity and latency.

Second physical host 206B includes a second ping agent 210B, a second virtual machine 214B, a second virtual NIC 216B, a second virtual switch 218B, a second external NIC 240B, and control logic 244B, which are operable in a manner similar to first ping agent 210A, first virtual machine 214A, first virtual NIC 216A, first virtual switch 218A, first external NIC 240A, and control logic 244A, respectively. Moreover, outbound rules 220B (including metering rules 224B, ACL rules 226B, a ping spoof block rule 228B, a CA-to-PA map rule 230B, and a NVGRE encapsulation rule 232B) and inbound rules 222B (including metering rules 234B, ACL rules 236B, a ping responder rule 212B, and a NVGRE encapsulation rule 242B) are operable in a manner similar to outbound rules 220A and inbound rules 222A that are included in first virtual switch 218A.

The flow of the ping packets and the ping response packets, as depicted in FIG. 2, will now be described in further detail. First ping agent 210A injects the ping packets into the outbound rules 220A. For example, first ping agent 210A may inject the ping packets through a device driver called a virtual filtering platform (VFP). In accordance with this example, the device driver may plug into first virtual switch 218A. In further accordance with this example, first ping agent 210A may program the device driver to create ping responder rule 212A and to inject the ping packets. In one example implementation, first ping agent 210A injects the ping packets below the metering rules 224A, the ACL rules 226A, and the ping spoof block rule 228A as depicted in FIG. 2, which causes the ping packets to not be processed by any of the metering rules 224A, the ACL rules 226A, and the ping spoof block rule 228A. For example, this may ensure that the ping packets are not treated as billable traffic for a customer of the virtual network. In another example, this may ensure that the ACL rules 226A do not block the ping packets. For instance, monitoring and alerting system 238 may not be capable of distinguishing whether ping packets for which a corresponding ping response packet is not received were lost due to network failure or were blocked by the ACL rules 226A. In accordance with this implementation, the ping packets are processed by the CA-to-PA map rule 230A and the NVGRE encapsulation rule 232A and then transferred toward the destination host (i.e., second virtual machine 214B). In another example implementation, the metering rules 224A, the ACL rules 226A, and the ping spoof block rule 228A may be modified to ignore the ping packets, which may enable the ping packets to be injected at the top of the outbound rules 220A. In accordance with this implementation, the ping packets may be passed through all of the outbound rules 220A (i.e., through the metering rules 224A, the ACL rules 226A, the ping spoof block rule 228A, the CA-to-PA map rule 230A, and the NVGRE encapsulation rule 232A).

The ping responder rule 212B intercepts the ping packets from the virtual network and converts the ping packets into ping response packets. For example, the ping responder rule 212B may set the destination addresses associated with the respective ping response packets to be the same as the source addresses associated with the respective ping packets. In another example, the ping responder rule 212B may swap the source and destination addresses and the source and destination ports in each ping packet to generate the ping response packets. In yet another example, a source port associated with a ping packet may have multiple addresses, and a destination port associate with the ping packet may have multiple addresses. Any address of the source port may be used as the source address for the ping packet, and any address of the destination port may be used as the destination address for the ping packet. The first address of the source port (i.e., the "Primary" address) may be used as the source address of the ping packet, though the example embodiments are not limited in this respect. It will be recognized that any address associated with the source port may be used as the source address of the ping packet. For instance, some networking failures or misconfigurations may be detected only if the source address of the ping packet is selected from all addresses of the source port and the destination address of the ping packet is selected from all addresses of the destination port. The ping responder rule 212B injects the ping response packets into the outbound rules 220B.

The ping responder rule 212B is shown to be below the metering rules 234B and the ACL rules 236B for non-limiting, illustrative purposes. It will be recognized that the metering rules 234B and the ACL rules 236B may be modified to ignore the ping packets, and the ping responder rule 212B may be placed at the top of the inbound rules 222B, which may enable the ping packets to pass through all of the inbound rules 222B.

In one example implementation, the ping responder rule 212B injects the ping response packets below the metering rules 224B, the ACL rules 226B, and the ping spoof block rule 228B as depicted in FIG. 2, which causes the ping response packets to not be processed by any of the metering rules 224B, the ACL rules 226B, and the ping spoof block rule 228B. In accordance with this implementation, the ping response packets are processed by the CA-to-PA map rule 230B and the NVGRE encapsulation rule 232B and then transferred toward the newly named destination host (i.e., first virtual machine 214A).

In another example implementation, the metering rules 224B, the ACL rules 226B, and the ping spoof block rule 228B may be modified to ignore the ping response packets, and the ping responder rule 212B may inject the ping response packets at the top of the outbound rules 220B. In accordance with this implementation, the ping response packets may pass through all of the outbound rules 220B (i.e., through the metering rules 224B, the ACL rules 226B, the ping spoof block rule 228B, the CA-to-PA map rule 230B, and the NVGRE encapsulation rule 232B).

In an example embodiment, first ping agent 210A may inject the ping packets with a source address of first virtual machine 214A and a destination address for one of the peers of first virtual machine 214A (e.g., second virtual machine 214B in this example) in the virtual network. In accordance with this embodiment, the ping packets and the ping response packets may use customer addresses for source and destination, and therefore may validate the correct operation of the customer address to provider address mappings and transforms and encapsulation layers that have been programmed in first and second virtual switches 218A and 218B by respective first and second ping agents 210A and 210B as the ping packets and the ping response packets traverse the network.

The ping responder rule 212A intercepts the ping response packets from the virtual network and forwards the ping response packets to first ping agent 210A for processing. The ping responder rule 212A is shown to be below the metering rules 234A and the ACL rules 236A for non-limiting, illustrative purposes. It will be recognized that the metering rules 234A and the ACL rules 236A may be modified to ignore the ping response packets, and the ping responder rule 212A may be placed at the top of the inbound rules 222A, which may enable the ping response packets to pass through all of the inbound rules 222A. First ping agent 210A may determine round-trip times associated with the ping packets and the corresponding ping response packets. First ping agent 210A may also determine whether a corresponding ping response packet was not received for any of the ping packets. First ping agent 210A may forward information regarding the round-trip times and any missing ping response packets to monitoring and alerting system 238 for processing.

Monitoring and alerting system 238 is configured to analyze the information received from ping agents (e.g., first ping agent 210A) to determine whether a loss of connectivity and/or a spike in network latency has occurred. If monitoring and alerting system 238 detects a loss of connectivity and/or a spike in network latency, monitoring and alerting system 238 generates an alert for manual operator intervention or automatic mitigation. Examples of automatic mitigation include but are not limited to (a) stopping ongoing software deployments or configuration changes on affected clusters or nodes, including triggering automatic rollback of changes, especially if deployments correlate closely in time or locality (node set) with the network failures; (b) automatic migration of customer VMs to clusters or nodes with healthy networking; (c) automatic throttling of low priority network traffic; and (d) automatic activation of standby networking devices.

Monitoring and alerting system 238 may perform aggregation of ping data based on the information that is received from first ping agent 210A to determine a blast radius of the networking failure. A blast radius indicates a proportion of the virtual network and/or the physical network that is impacted by the network failure. For instance, the ping data may be aggregated to determine that the scope of the network failure is a single link, all links for a VM (inbound-only, outbound-only, or both), all VMs on a physical node, multiple nodes in a cluster, all physical nodes in a rack (likely top-of-rack (TOR) switch), all racks in a cluster, all clusters in a region, or multiple regions.

If all the impacted nodes are under a single TOR switch, or if multiple racks under a single core switch are affected, monitoring and alerting system 238 may identify the likely culprit device and inform operators of the same, and/or monitoring and alerting system 238 may start automatic mitigation.

In one example implementation, information regarding pings (e.g., ping packets and ping response packets) is aggregated for a one-minute interval and logged. The information may indicate any of a variety of attributes associated with each ping packet and/or each ping response packet. Examples of such information include but are not limited to source and destination addresses for the packet, a VM identifier indicating a VM associated with the packet, a node identifier indicating a physical host with which the packet is associated, a cluster identifier indicating a cluster with which the packet is associated, a successful ping count (i.e., a number of ping response packets successfully received), a total ping count (i.e., a total number of ping packets sent), and latency (e.g., in microseconds).

Monitoring and alerting system 238 may provide graphs of historical ping data and allow logs to be queried to determine connectivity and latency for specific VMs, nodes, and/or clusters. This historical data can be useful to correlate in time with other logs to determine whether a configuration or software update or other change caused a network impact even if the impact was not sufficient to trigger alerts (e.g., even if the impact does not constitute a network failure).

First ping agent 210A may be able to inject ping packets only when first ping agent 210A has correct and complete customer addresses (CAs) for the hosts in the virtual network. If CAs are missing, then it may not be possible for ping packets to be injected. To detect this error, monitoring and alerting system 238 may monitor the total number of ping packets injected for a given cluster or region or other aggregation. If the number of ping packets with respect to a designated duration of time drops significantly for a cluster, monitoring and alerting system 238 may generate an alert because the lower number of ping packets may indicate an error in the CA mapping control plane for the cluster or region.

Physical network 246 may be a wide-area network (e.g., the Internet), a local area network (LAN), another type of network, or a combination thereof.

The ping packets have been described as flowing from first ping agent 210A to the ping responder rule 212B, and the ping response packets have been described as flowing from the ping responder rule 212B to the ping responder rule 212A and ultimately to first ping agent 210A, for non-limiting illustrative purposes. It will be recognized that second ping agent 210B also provides ping packets, which are intercepted and converted by the ping responder rule 212A; and the ping responder rule 212A provides the corresponding ping response packets, which are intercepted by the ping responder rule 212B and which are forwarded to second ping agent 210B. The flow of the ping packets from second ping agent 210B and the flow of the corresponding ping response packets from the ping responder rule 212A are not shown in FIG. 2 for purposes of clarity.

The ping packets and the ping response packets described herein may have any suitable format. For instance, standard ICMP echo request/echo response packets may be used, though it should be noted that ICMP packets often are filtered at network boundaries or layers (e.g., at load balancers) where TCP or UDP packets are allowed. ICMP packets also lack source and destination ports and may be processed by networking layers differently from typical customer data flows that use TCP or UDP. Using TCP SYN for the ping packets and SYN-ACK for the ping response packets has the advantage that ping packets and ping response packets are easily distinguishable in packet captures. TCP packets also have a variable length Options header that can be used to tag ping packets with identifiable metadata. The payload of a UDP packet could also be used for this purpose, but the TCP Options header is more likely to already be supported by packet filter parsers and less likely to occur in customer packet flows. Accordingly, it may be desirable for a ping packet to be formatted as a TCP SYN packet, and it may be desirable for a ping response packet to be formatted as a TCP SYN-ACK packet. A TCP SYN packet is a packet that has a SYN flag set in the TCP header. A TCP SYN-ACK packet is a packet that has a SYN flag set and an ACK flag set in the TCP header.

Because first and ping agents 210A and 210B and first and second ping responder rules 212A and 212B actively inject significant traffic into the virtual network, it may be desirable to implement some safety features.

A first example safety feature is a master off switch. In the example embodiments described herein, ping agents inject traffic into a virtual network, ideally covering all links between all VMs in the virtual network. It may be desirable for the ping agents to inject the ping packets as frequently as possible to reduce the time to detect failures. This may introduce a threat, especially with large virtual networks with many virtual machines, of an accidental ping flood in which case the ping packets saturate the virtual network and interfere with normal traffic. Incorporating ping responder rules in the packet filtering rules of the virtual switches to intercept the ping packets may cause a risk of accidentally intercepting and dropping or misdirecting customer packets. To mitigate these risks, a master off switch configuration setting may be implemented to remove the ping packet responder and block rules in the virtual network filtering layers and/or disable the ping injection threads in all the ping agents.

A second example safety feature is a rate limiter. To reduce the chance of an accidental ping flood due to misconfiguration of ping threads, misconfiguration of the interval between pings, or duplication within the list of ping destinations, the rate limiter may be coded into the ping injection routine that limits the number of pings injected per second regardless of the frequency of pings requested by upper layers of the ping agent controller.

A third example safety feature is a destination address randomizer. There may be a risk, especially with large virtual networks with many machines, that multiple ping agents may simultaneously ping the same virtual machine destination address, flooding the destination virtual switch and destination virtual machine's VNIC port. This may potentially overwhelm packet buffers and cause customer traffic to be dropped. To mitigate this risk, each ping agent may randomize the list of destination addresses before injecting its ping packets.

A fourth example safety feature is customer flow priority. When a TCP ping packet format is used, there may be a risk that a customer may attempt to make a connection with the same five-tuple (i.e., source address, destination address, source port, destination port, and protocol) being injected by the ping agent as ping TCP SYN. The packet injection routines may be configured to not allow a ping packet to interrupt an existing customer flow with the same five-tuple and may allow a customer flow to be created even if a ping flow with the same five-tuple exists (i.e., the ping should return an error). The chances of a customer flow collision may be substantially reduced if each ping packet uses a random source port and a random destination port.

A fifth example safety feature is a RST packet. RST is the reset flag in the Transmission Control Protocol (TCP). When a TCP ping packet format is used, there may be a risk that networking layers on the physical hosts or intervening network switches may allocate resources to track the flows (five-tuple) associated with the TCP SYN ping packet and exhaust these resources. To mitigate this risk, in addition to SYN and SYN-ACK, the ping agent may also send a TCP RST packet to the destination to signal the various networking layers to release resources that may have been allocated for the flow.

A sixth example safety feature is a ping spoof block rule. This packet filtering rule blocks hosts from sending spoof ping packets which might interfere with the proper operation of the Ping Agent.

For large virtual networks containing hundreds or thousands of virtual machines, pinging all links in a short time interval may be impossible due to the amount of network traffic that would be generated by ping agents. To deal with this situation and allow links that are most important to customers to be pinged in a short time interval, scalability features may be supported.

A first example scalability feature is active flow monitoring. The ping agent periodically queries the virtual switch to determine active customer flows (five-tuples) for a given virtual NIC port and may ping those destination addresses using random or non-conflicting source and destination ports to prevent flow collisions with the customer connections.

A second example scalability feature is customer subnet prioritization. For each virtual network, customers can specify a list of subnet priorities for monitoring. The list may be an ordered list of subnet pairs and/or individual subnets from higher to lower priority. For a subnet pair, the ping agent may prioritize inter-subnet pings between the two subnets. For an individual subnet, the ping agent may prioritize intra-subnet pings.

A third example scalability feature is peered virtual network sampling. In virtual network sampling, the ping agent chooses one random destination address from each peered VNET.

Figure 3:
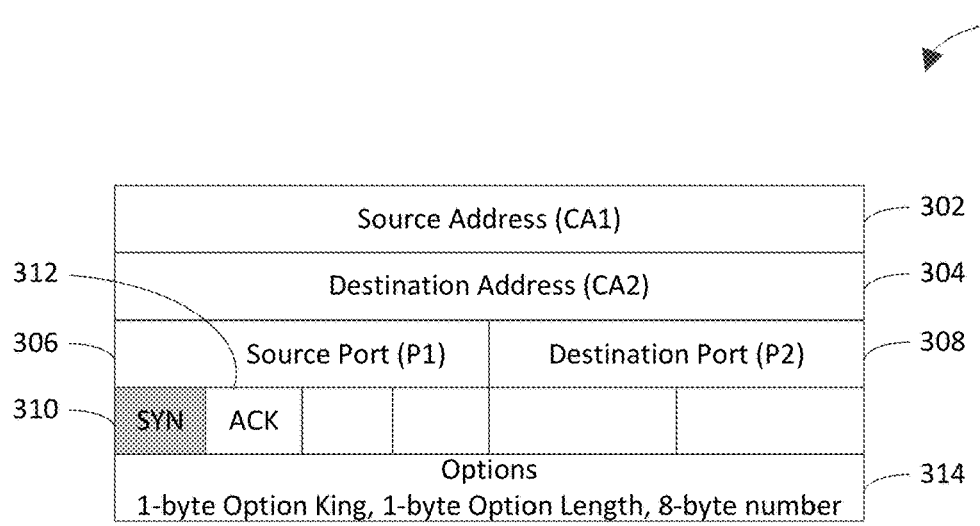
FIG. 3 shows an example ping packet TCP SYN header in accordance with an embodiment.

FIG. 3 shows an example ping packet TCP SYN header 300 in accordance with an embodiment. As shown in FIG. 3, the TCP SYN header 300 includes a source address (CA1) 302, a destination address (CA2) 304, a source port (P1) 306, a destination port (P2) 308, a SYN flag 310, an ACK flag 312, and an Options header 314. The ping packet TCP SYN header 300 is characterized by the SYN flag 310 being set, as depicted in FIG. 3. The Options header 314 includes an un-reserved TCP Option Kind, Option Length, and an 8-byte number (e.g., "magic" number) to uniquely identify ping packets and to facilitate distinguishing the ping packets from other traffic in the virtual network.

Figure 4:
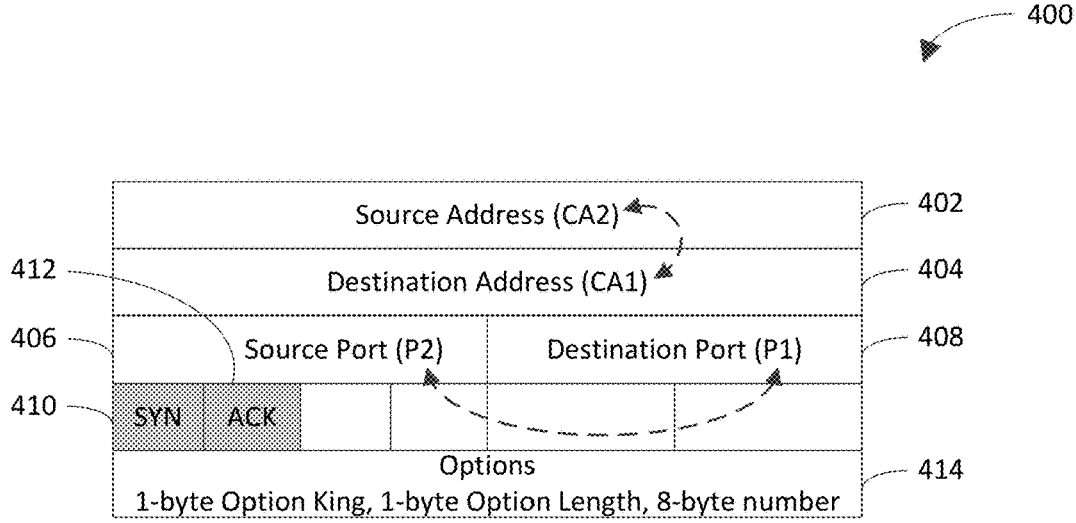
FIG. 4 shows an example ping response packet TCP SYN-ACK header in accordance with an embodiment.

FIG. 4 shows an example ping response packet TCP SYN-ACK header 400 in accordance with an embodiment. As shown in FIG. 4, the TCP SYN-ACK header 400 includes a source address (CA2) 402, a destination address (CA1) 404, a source port (P2) 406, a destination port (P1)

408, a SYN flag 410, an ACK flag 412, and an Options header 414. The ping packet TCP SYN-ACK header 400 is characterized by the SYN flag 410 and the ACK flag 412 being set, as depicted in FIG. 4. Note that the source address (CA2) 402 in the TCP SYN-ACK header 400 is the same as the destination address (CA2) 304 in the TCP SYN header 300, and the destination address (CA1) 404 in the TCP SYN-ACK header 400 is the same as the source address (CA1) 302 in the TCP SYN header. Accordingly, the source and destination addresses in the TCP SYN header 300 have been swapped in the TCP SYN-ACK header 400, as indicated by dashed arrow 416. Note also that the source port (P2) 406 in the TCP SYN-ACK header 400 is the same as the destination port (P2) 308 in the TCP SYN header 300, and the destination port (P1) 408 in the TCP SYN-ACK header 400 is the same as the source port (P1) 306 in the TCP SYN header 300. Accordingly, the source and destination ports in the TCP SYN header 300 have been swapped in the TCP SYN-ACK header 400, as indicated by dashed arrow 418. The Options header 414 includes an un-reserved TCP Option Kind, Option Length, and an 8-byte number (e.g., "magic" number) to uniquely identify ping response packets and to facilitate distinguishing the ping response packets from other traffic in the virtual network.

Figure 5:
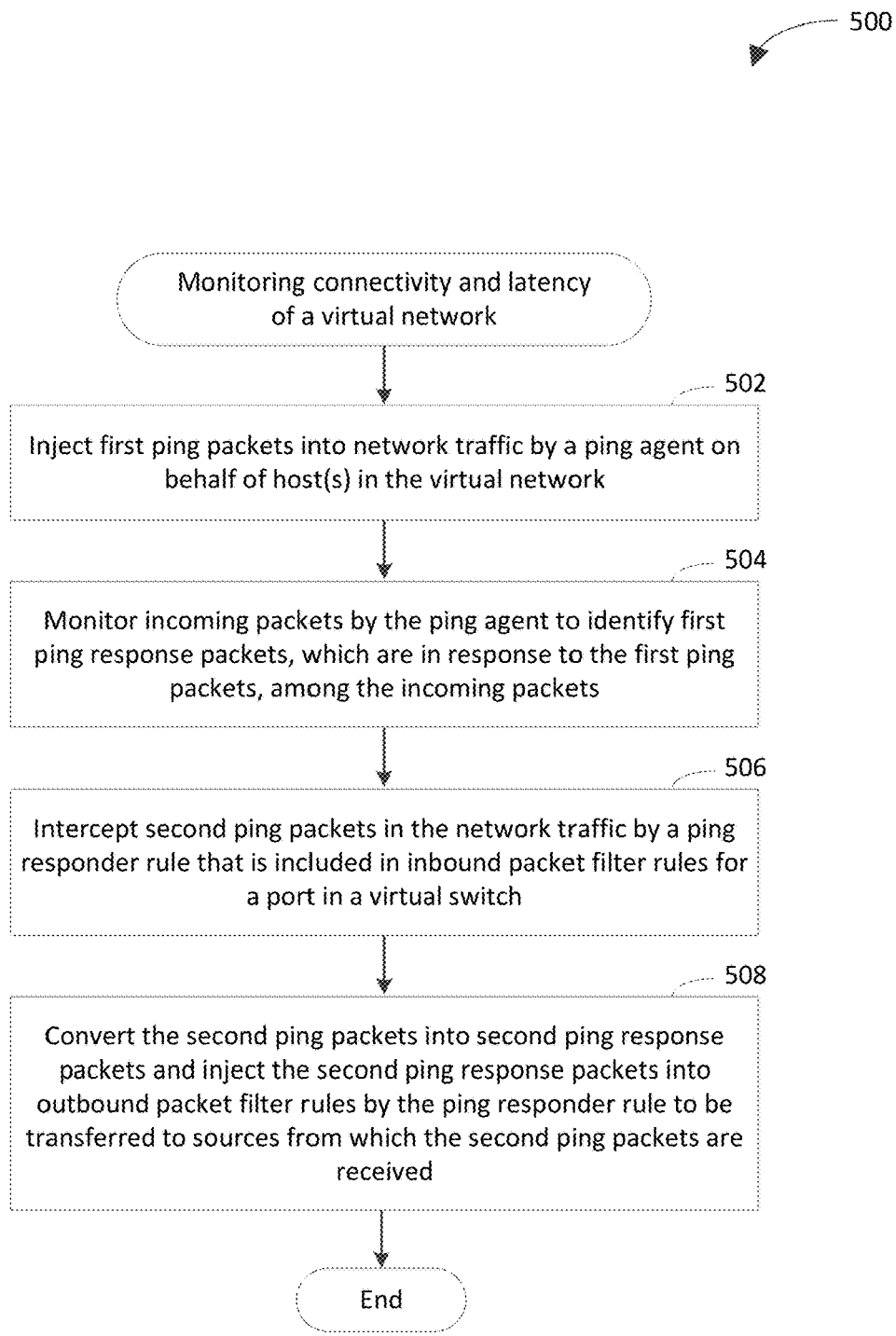
FIGS. 5-7 depict flowcharts of example methods for monitoring connectivity and latency of a virtual network in accordance with embodiments.

FIG. 5 depicts a flowchart 500 of an example method for monitoring connectivity and latency of a virtual network in accordance with an embodiment. Flowchart 500 may be performed by virtual networking ping system 100 (e.g., connectivity and latency logic 108 therein) shown in FIG. 1 or virtual networking ping system 200 shown in FIG. 2, for example. For illustrative purposes, flowchart 500 is described with respect to virtual networking ping system 200. Further structural and operational embodiments will be apparent to persons skilled in the relevant art(s) based on the discussion regarding flowchart 500.

As shown in FIG. 5, the method of flowchart 500 begins at step 502. In step 502, first ping packets are injected into network traffic by a ping agent on behalf of host(s) in the virtual network. Each host in the virtual network may be a physical host or a virtual host (e.g., a virtual machine). In one example, the ping agent executes externally from the host(s) in the virtual network. In another example, the ping agent executes on a physical server that hosts a hypervisor for the host(s) in the virtual network. In yet another example, the ping agent executes on a switch (e.g., a physical switch or a virtual switch) that provides virtual network isolation for physical hosts that participate in a virtual network and that do not run in a hypervisor. In an example implementation, first ping agent 210A injects the first ping packets into network traffic on behalf of first virtual machine 214A in the virtual network.

At step 504, incoming packets are monitored by the ping agent to identify first ping response packets, which are in response to the first ping packets, among the incoming packets. In an example implementation, first ping agent 210A monitors incoming packets to identify first ping response packets, which are in response to the first ping packets, among the incoming packets.

At step 506, second ping packets are intercepted in the network traffic by a ping responder rule that is included in inbound packet filter rules for a port in a virtual switch. For instance, the virtual switch may process network traffic for virtual machine(s) in the virtual network. In an example implementation, ping responder rule 212B, which is included in inbound packet implementation, ping responder rule 212B the second ping packets are converted into second ping filter rules 222B for a port in second virtual switch 218B, intercepts second ping packets in the network traffic.

In an example embodiment, the inbound packet filter rules include a metering rule, an access control list (ACL) rule, and the ping responder rule. In accordance with this embodiment, intercepting the second ping packets at step 506 includes inhibiting, by the ping responder rule, the second ping packets from being processed by the metering rule and the access control rule.

At step 508, the second ping packets are converted into second ping response packets and inject the second ping response packets into outbound packet filter rules by the ping responder rule to be transferred to sources from which the second ping packets are received. In an example implementation, ping responder rule 212B converts the second ping packets into second ping response packets and injects the second ping response packets into outbound packet filter rules 220B to be transferred to sources from which the second ping packets are received.

In an example embodiment, each of the second ping packets specifies a source address from which the respective second ping packet is received, a destination address to which the respective second ping packet is to be provided, a name of a source port from which the respective second ping packet is received, and a name of a destination port to which the respective second ping packet is to be provided. In accordance with this embodiment, converting the second ping packets into the second ping response packets at step 508 includes swapping the source address and the destination address and swapping the name of the source port and the name of the destination port from each second ping packet to generate the respective second ping response packet. In an aspect of this embodiment, converting the second ping packets into the second ping response packets at step 508 may include adding a response packet flag to each second ping response packet. For example, the response packet flag may be useable to distinguish the second ping response packets from other packets. In accordance with this example, the response package flag may uniquely identify the second ping response packets from the other packets.

In another example embodiment, the outbound packet filter rules include a metering rule and an access control list (ACL) rule. In one aspect of this embodiment, injecting the first ping packets into the network traffic at step 502 includes injecting the first ping packets into the network traffic by the ping agent without passing the first ping packets through the metering rule and without passing the first ping packets through the access control list rule. In another aspect of this embodiment, injecting the second ping response packets into the outbound packet filter rules at step 508 includes injecting the second ping response packets into the outbound packet filter rules by the ping responder rule without passing the second ping response packets through the metering rule and without passing the second ping response packets through the access control list rule. In yet another example aspect of this embodiment, the metering rule and the access control list rule are configured to ignore the first ping packets and the second ping response packets.

In yet another example embodiment, the outbound packet filter rules include a ping spoof block rule. In accordance with this embodiment, the ping spoof block rule is configured to ignore the first ping packets and the second ping response packets.

In still another example embodiment, each second ping packet is configured to be identifiable as a ping packet based at least in part on the respective second ping packet having a TCP SYN header. In accordance with this embodiment, each second ping response packet is configured to be identifiable as a ping response packet based at least in part on the respective ping response packet having a TCP SYN-ACK header.

In some example embodiments, one or more steps 502, 504, 506, and/or 508 of flowchart 500 may not be performed. Moreover, steps in addition to or in lieu of steps 502, 504, 506, and/or 508 may be performed. For instance, in an example embodiment, flowchart 500 further includes providing, by the ping agent, a TCP RST packet to destination host(s) associated with the first ping packets, the TCP RST packet indicating that resources allocated to the first ping packets are to be released. For example, first ping agent 210A may provide the TCP RST packet to second virtual machine 214B.

In another example embodiment, the method of flowchart 500 further includes randomizing, by the ping agent, destination addresses to which the first ping packets are directed before the ping agent injects the first ping packets into the network traffic. For instance, first ping agent 210A may randomize the destination addresses.

In yet another example embodiment, a first ping packet and another packet in the network traffic share a common source address, a common destination address, a common source port, a common destination port, and a common protocol. In accordance with this embodiment, the method of flowchart 500 further includes (a) disallowing, by the ping agent, the first ping packet from interrupting the other packet and/or (b) enabling, by the ping agent, the other packet to be created despite the designated first ping packet and the other packet sharing the common source address, the common destination address, the common source port, the common destination port, and the common protocol. For example, first ping agent 210A may disallow the first ping packet from interrupting the other packet and/or enable the other packet to be created.

In still another example embodiment, the method of flowchart 500 further includes periodically querying the virtual switch by the ping agent to determine destination addresses for packets that are provided via a virtual NIC port. In accordance with this embodiment, the method of flowchart 500 further includes providing ping packets to the destination addresses using random source and destination ports by the ping agent to avoid collisions between the ping packets and other network traffic. For instance, first ping agent 210A may periodically query first virtual switch 218A to determine the destination addresses and provide the ping packets to the destination addresses using the random source and destination ports.

In another example embodiment, the method of flowchart 500 further includes selecting, by the ping agent, one random destination address to which a first ping packet is to be sent for each peered virtual network. For example, first ping agent 210A may select one random destination address for each peered virtual network.

In yet another example embodiment, the method of flowchart 500 further includes distinguishing the second ping packets from other packets in the network traffic by the ping responder rule based at least in part on each second ping packet having a pre-defined TCP option code and a pre-defined number in an options header of the respective second ping packet. In an aspect of this embodiment, the TCP option code may uniquely identify the second ping packets. In another aspect of this embodiment, the pre-defined number may be a 32-bit number, a 64-bit number, or a 128-bit number. In an example implementation, first ping responder rule 212A may distinguish the second ping packets from the other packets.

In still another example embodiment, the method of flowchart 500 further includes modifying the outbound packet filter rules to cause the first ping packets to not be processed by user-defined routes (UDRs). For instance, control logic 244A may modify outbound packet filter rules 220A to cause the first ping packets to not be processed by the UDRs.

In another example embodiment, the method of flowchart 500 further includes limiting a rate at which the ping agent injects the first ping packets into the network traffic regardless of a rate at which the ping agent requests the first ping packets. For example, control logic 244A may limit the rate at which first ping agent 210A injects the first ping packets into the network traffic.

In yet another example embodiment, the method of flowchart 500 further includes disabling the ping agent and the ping responder rule without interfering with other network traffic in the virtual network based at least in part on selection of a switch that controls operability of the ping agent and the ping responder rule. For instance, control logic 244A may disable first ping agent 210A and ping responder rule 212A without interfering with the other network traffic in the virtual network.

In still another example embodiment, the method of flowchart 500 further includes enabling a user of the virtual network to prioritize subnets of the virtual network for which to monitor connectivity and latency. For example, control logic 244A may enable the user to prioritize the subnets of the virtual network.

Figure 6:
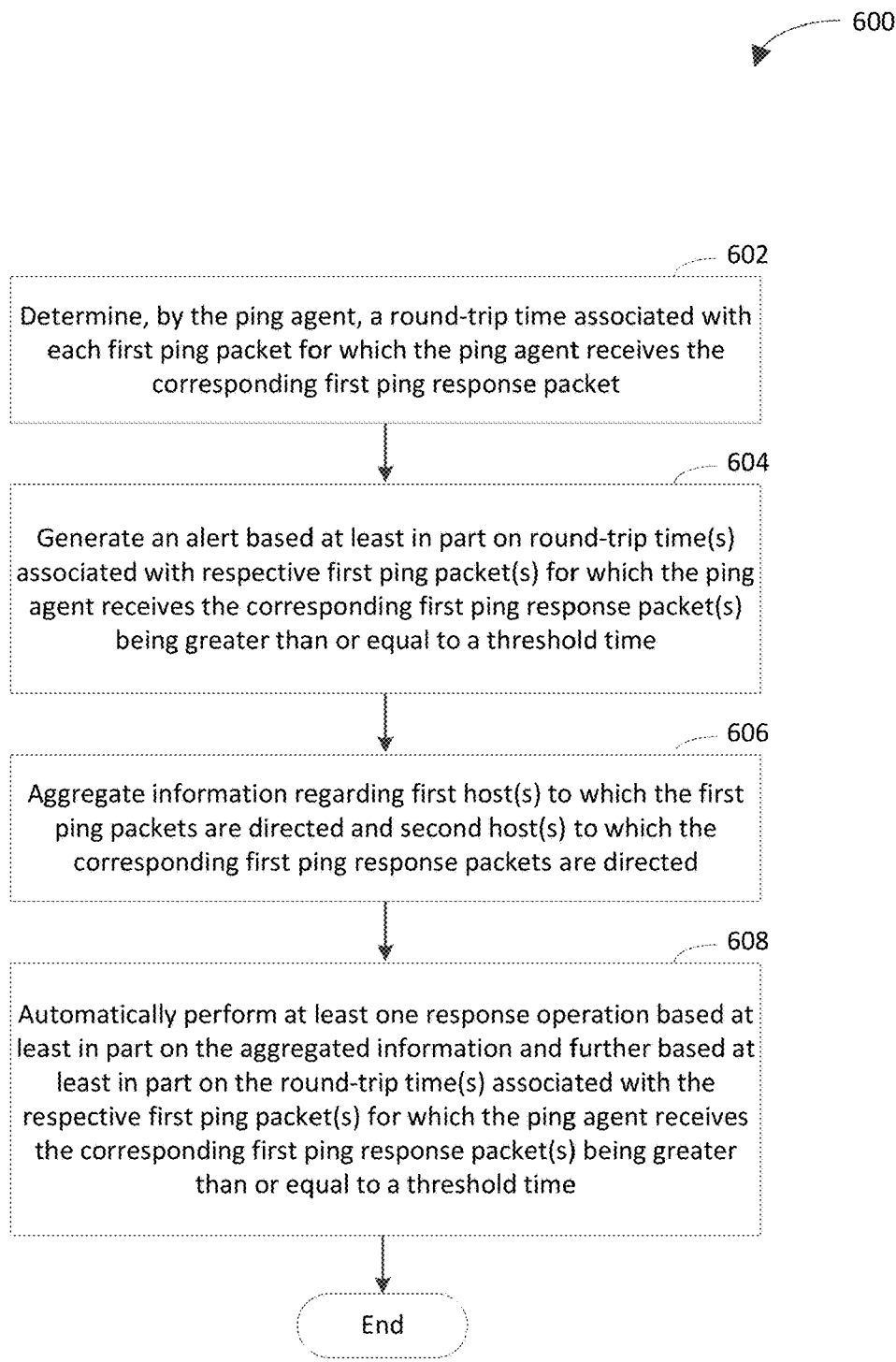

In another example embodiment, the method of flowchart 500 includes one or more steps of flowchart 600 in FIG. 6. As shown in FIG. 6, the method of flowchart 600 begins at step 602. In step 602, a round-trip time associated with each first ping packet for which the ping agent receives the corresponding first ping response packet is determined by the ping agent. The round-trip time is equal to a difference between a send time instance at which the ping agent injects the respective first ping packet into the network traffic and a receipt time instance at which the ping agent receives the corresponding first ping response packet. In an example implementation, first ping agent 210A determines the round-trip time associated with each first ping packet for which first ping agent 210A receives the corresponding first ping response packet.

At step 604, an alert is generated (e.g., by a monitoring and alerting system) based at least in part on round-trip time(s) associated with respective first ping packet(s) for which the ping agent receives the corresponding first ping response packet(s) being greater than or equal to a threshold time. The alert may indicate (e.g., identify) the following information for each first ping packet: source and destination addresses, IDs for physical source and destination hosts, and/or IDs for clusters that include the physical source and destination hosts. The alert may be generated at step 604 further based at least in part on a number of the round-trip time(s) being greater than or equal to a threshold number. In an example implementation, monitoring and alerting system 238 generates the alert.

At step 606, information regarding first host(s) to which the first ping packets are directed and second host(s) to which the corresponding first ping response packets are directed is aggregated (e.g., by the monitoring and alerting system). In an example embodiment, monitoring and alerting system 238 aggregates information regarding second virtual machine 214B to which the first ping packets are directed and first virtual machine 214A to which the corresponding first ping response packets are directed.

In an example embodiment, the aggregated information indicates a scope of a failure of the virtual network. For instance, the aggregated information may indicate that the scope of the failure is a single link; all links for a virtual machine (inbound only, outbound only, or both); all virtual machines on a physical node; multiple nodes in a cluster; all physical nodes in a rack (e.g., top-of-rack (TOR) switch); all racks in a cluster; all clusters in a region; or multiple regions. The scope of the failure may be referred to as a "blast radius" of the failure.

At step 608, at least one response operation is automatically performed (e.g., by the monitoring and alerting system) based at least in part on the aggregated information and further based at least in part on the round-trip time(s) associated with the respective first ping packet(s) for which the ping agent receives the corresponding first ping response packet(s) being greater than or equal to a threshold time. In an example implantation, monitoring and alerting system 238 automatically performs at least one response operation. One example of a response operation is stopping software development and/or a configuration change on cluster(s) of nodes and/or node(s) in a cluster, based at least in part on the first host(s) and the second host(s) being included in the cluster(s) and/or the node(s). Another example of a response operation is migrating hosts associated with the first ping packet(s) to cluster(s) or node(s) that include none of the first host(s) and none of the second host(s). Yet another example of a response operation is throttling network traffic having a priority that is less than a threshold priority. Still another example of a response operation is activating standby networking devices.

Figure 7:
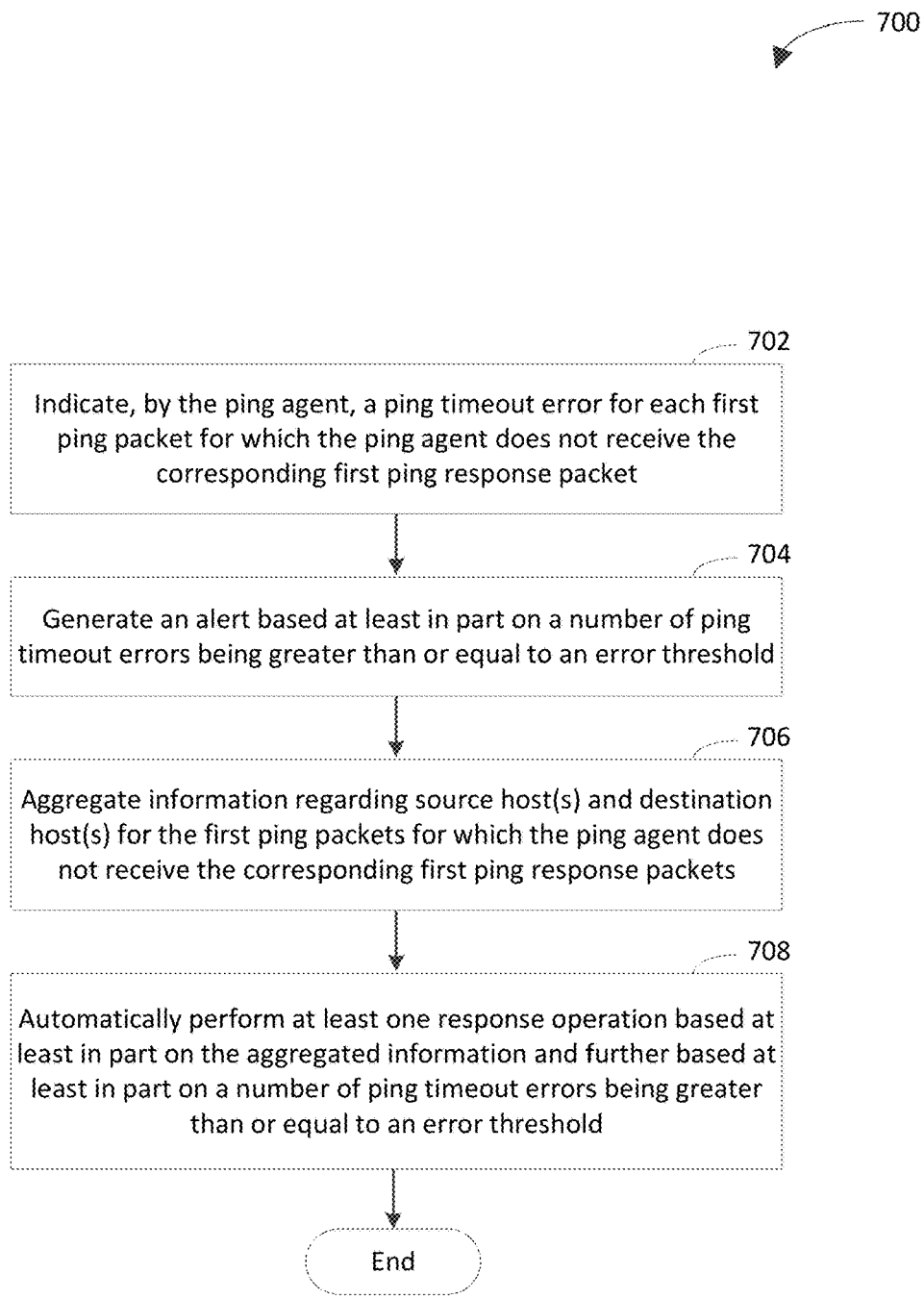

In yet another example embodiment, the method of flowchart 500 includes one or more steps of flowchart 700 in FIG. 7. As shown in FIG. 7, the method of flowchart 700 begins at step 702. In step 702, a ping timeout error is indicated by the ping agent for each first ping packet for which the ping agent does not receive the corresponding first ping response packet. In an example implementation, first ping agent 210A indicates the ping timeout error for each first ping packet for which first ping agent 210A does not receive the corresponding first ping response packet.

At step 704, an alert is generated (e.g., by the monitoring and alerting system) based at least in part on a number of ping timeout errors being greater than or equal to an error threshold. In an example implementation, monitoring and alerting system 238 generates the alert.

At step 706, information regarding source host(s) and destination host(s) is aggregated (e.g., by the monitoring and alerting system) for the first ping packets for which the ping agent does not receive the corresponding first ping response packets. In an example implementation, monitoring and alerting system 238 aggregates the information.

At step 708, at least one response operation is automatically performed (e.g., by the monitoring and alerting system) based at least in part on the aggregated information and further based at least in part on a number of ping timeout errors being greater than or equal to an error threshold. In an example implementation, monitoring and alerting system 238 automatically performs at least one response operation. One example of a response operation is stopping software development and/or a configuration change on cluster(s) of nodes and/or node(s) in a cluster, based at least in part on the source host(s) and the destination host(s) being included in the cluster(s) and/or the node(s). Another example of a response operation is migrating the source host(s) and the destination host(s) to cluster(s) or node(s) having fewer ping timeout errors than cluster(s) or node(s) from which the source host(s) and the destination host(s) are migrated. Yet another example of a response operation is throttling network traffic having a priority that is less than a threshold priority. Still another example of a response operation is activating standby networking devices.

In an example embodiment, the aggregated information indicates a scope of a failure of the virtual network.

Any one or more of connectivity and latency logic 108, flowchart 500, flowchart 600, and/or flowchart 700 may be implemented in hardware, software, firmware, or any combination thereof. For example, any one or more of connectivity and latency logic 108, flowchart 500, flowchart 600, and/or flowchart 700 may be implemented, at least in part, as computer program code configured to be executed in one or more processors. In another example, any one or more of connectivity and latency logic 108, flowchart 500, flowchart 600, and/or flowchart 700 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

III. Further Discussion of Some Example Embodiments

An example system to monitor connectivity and latency of a virtual network comprises memory and one or more processors coupled to the memory. The one or more processors are configured to execute a ping agent and further configured to execute a ping responder rule among inbound packet filter rules for a port in a virtual switch. The ping agent is configured to inject first ping packets into network traffic on behalf of one or more hosts in the virtual network. The ping agent is further configured to monitor incoming packets to identify first ping response packets, which are in response to the first ping packets, among the incoming packets. The ping responder rule is configured to intercept second ping packets in the network traffic. The ping responder rule is further configured to convert the second ping packets into second ping response packets and to inject the second ping response packets into outbound packet filter rules to be transferred to sources from which the second ping packets are received.

In a first aspect of the example system, the one or more processors are configured to execute the ping agent externally from the one or more hosts in the virtual network.

In a first example of the first aspect, the one or more processors are configured to execute the ping agent on a physical server that hosts a hypervisor for the one or more hosts in the virtual network.

In a second example of the first aspect, the one or more processors are configured to execute the ping agent on a switch that provides virtual network isolation for physical hosts that participate in a virtual network and that do not run in a hypervisor.

In a second aspect of the example system, each of the second ping packets specifies a source address from which the respective second ping packet is received, a destination address to which the respective second ping packet is to be provided, a name of a source port from which the respective second ping packet is received, and a name of a destination port to which the respective second ping packet is to be provided. In accordance with the second aspect, the ping responder rule is configured to convert the second ping packets into the second ping response packets by swapping the source address and the destination address and by swapping the name of the source port and the name of the destination port from each second ping packet to generate the respective second ping response packet. The second aspect of the example system may be implemented in combination with the first aspect of the example system, though the example embodiments are not limited in this respect.

In an example of the second aspect, the ping responder rule is configured to convert the second ping packets into the second ping response packets further by adding a response packet flag to each second ping response packet.

In a third aspect of the example system, the ping responder rule is configured to distinguish the second ping packets from other packets in the network traffic based at least in part on each second ping packet having a pre-defined TCP option code and a pre-defined number in an options header of the respective second ping packet. The third aspect of the example system may be implemented in combination with the first and/or second aspect of the example system, though the example embodiments are not limited in this respect.

In a fourth aspect of the example system, the ping agent is configured to determine a round-trip time associated with each first ping packet for which the ping agent receives the corresponding first ping response packet, the round-trip time being equal to a difference between a send time instance at which the ping agent injects the respective first ping packet into the network traffic and a receipt time instance at which the ping agent receives the corresponding first ping response packet. The fourth aspect of the example system may be implemented in combination with the first, second, and/or third aspect of the example system, though the example embodiments are not limited in this respect.

In a first example of the fourth aspect, the one or more processors are further configured to execute a monitoring and alerting system, the monitoring and alerting system configured to generate an alert based at least in part on one or more round-trip times associated with one or more respective first ping packets for which the ping agent receives the corresponding one or more first ping response packets being greater than or equal to a threshold time.

In a second example of the fourth aspect, the one or more processors are further configured to execute a monitoring and alerting system. The monitoring and alerting system is configured to aggregate information regarding one or more first hosts to which the first ping packets are directed and one or more second hosts to which the corresponding first ping response packets are directed. The monitoring and alerting system is configured to automatically perform at least one of the following operations based at least in part on the aggregated information and further based at least in part on one or more round-trip times associated with one or more respective first ping packets for which the ping agent receives the corresponding one or more first ping response packets being greater than or equal to a threshold time: stop at least one of software development or a configuration change on at least one of (a) one or more clusters of nodes or (b) one or more nodes in a cluster, based at least in part on the one or more first hosts and the one or more second hosts being included in the at least one of the one or more clusters or the one or more nodes; migrate hosts associated with the one or more first ping packets to one or more clusters or one or more nodes that include none of the one or more first hosts and none of the one or more second hosts; throttle network traffic having a priority that is less than a threshold priority; activate standby networking devices.

In an implementation of the second example of the fourth aspect, the aggregated information indicates a scope of a failure of the virtual network.

In a fifth aspect of the example system, the ping agent is further configured to indicate a ping timeout error for each first ping packet for which the ping agent does not receive the corresponding first ping response packet. In accordance with the fifth aspect, the one or more processors are further configured to execute a monitoring and alerting system. In further accordance with the fifth aspect, the monitoring and alerting system is configured to generate an alert based at least in part on a number of ping timeout errors being greater than or equal to an error threshold. The fifth aspect of the example system may be implemented in combination with the first, second, third, and/or fourth aspect of the example system, though the example embodiments are not limited in this respect.

In a sixth aspect of the example system, the ping agent is further configured to indicate a ping timeout error for each first ping packet for which the ping agent does not receive the corresponding first ping response packet. In accordance with the sixth aspect, the one or more processors are further configured to execute a monitoring and alerting system. In further accordance with the sixth aspect, the monitoring and alerting system is configured to aggregate information regarding one or more source hosts and one or more destination hosts for the first ping packets for which the ping agent does not receive the corresponding first ping response packets. In further accordance with the sixth aspect, the monitoring and alerting system is configured to automatically perform at least one of the following operations based at least in part on the aggregated information and further based at least in part on a number of ping timeout errors being greater than or equal to an error threshold: stop at least one of software development or a configuration change on at least one of (a) one or more clusters of nodes or (b) one or more nodes in a cluster, based at least in part on the one or more source hosts and the one or more destination hosts being included in the at least one of the one or more clusters or the one or more nodes; migrate the one or more source hosts and the one or more destination hosts to one or more clusters or one or more nodes having fewer ping timeout errors than one or more clusters or one or more nodes from which the one or more source hosts and the one or more destination hosts are migrated; throttle network traffic having a priority that is less than a threshold priority; activate standby networking devices. The sixth aspect of the example system may be implemented in combination with the first, second, third, fourth, and/or fifth aspect of the example system, though the example embodiments are not limited in this respect.

In an example of the sixth aspect, the aggregated information indicates a scope of a failure of the virtual network.

In a seventh aspect of the example system, the inbound packet filter rules include a metering rule, an access control list (ACL) rule, and the ping responder rule. In accordance with the seventh aspect, the ping responder rule is configured to inhibit the second ping packets from being processed by the metering rule and the access control rule by intercepting the second ping packets. The seventh aspect of the example system may be implemented in combination with the first, second, third, fourth, fifth, and/or sixth aspect of the example system, though the example embodiments are not limited in this respect.

In an eighth aspect of the example system, the outbound packet filter rules include a metering rule and an access control list (ACL) rule. In accordance with the eighth aspect, the ping agent is configured to inject the first ping packets into the network traffic without passing the first ping packets through the metering rule and without passing the first ping packets through the access control list rule. The eighth aspect of the example system may be implemented in combination with the first, second, third, fourth, fifth, sixth, and/or seventh aspect of the example system, though the example embodiments are not limited in this respect.

In a ninth aspect of the example system, the outbound packet filter rules include a metering rule and an access control list (ACL) rule. In accordance with the ninth aspect, the ping responder rule is configured to inject the second ping response packets into the outbound packet filter rules without passing the second ping response packets through the metering rule and without passing the second ping response packets through the access control list rule. The ninth aspect of the example system may be implemented in combination with the first, second, third, fourth, fifth, sixth, seventh, and/or eighth aspect of the example system, though the example embodiments are not limited in this respect.

In a tenth aspect of the example system, the outbound packet filter rules include a metering rule and an access control list (ACL) rule. In accordance with the tenth aspect, the metering rule and the access control list rule are configured to ignore the first ping packets and the second ping response packets. The tenth aspect of the example system may be implemented in combination with the first, second, third, fourth, fifth, sixth, seventh, eighth, and/or ninth aspect of the example system, though the example embodiments are not limited in this respect.

In an eleventh aspect of the example system, the outbound packet filter rules include a ping spoof block rule. In accordance with the eleventh aspect, the ping spoof block rule is configured to ignore the first ping packets and the second ping response packets. The eleventh aspect of the example system may be implemented in combination with the first, second, third, fourth, fifth, sixth, seventh, eighth, ninth, and/or tenth aspect of the example system, though the example embodiments are not limited in this respect.

In a twelfth aspect of the example system, each second ping packet is configured to be identifiable as a ping packet based at least in part on the respective second ping packet having a TCP SYN header. In accordance with the twelfth aspect, each second ping response packet is configured to be identifiable as a ping response packet based at least in part on the respective ping response packet having a TCP SYN-ACK header. The twelfth aspect of the example system may be implemented in combination with the first, second, third, fourth, fifth, sixth, seventh, eighth, ninth, tenth, and/or eleventh aspect of the example system, though the example embodiments are not limited in this respect.

In a thirteenth aspect of the example system, the ping agent is configured to provide a TCP RST packet to one or more destination hosts associated with the first ping packets, the TCP RST packet indicating that resources allocated to the first ping packets are to be released. The thirteenth aspect of the example system may be implemented in combination with the first, second, third, fourth, fifth, sixth, seventh, eighth, ninth, tenth, eleventh, and/or twelfth aspect of the example system, though the example embodiments are not limited in this respect.

In a fourteenth aspect of the example system, the one or more processors are configured to disable the ping agent and the ping responder rule without interfering with other network traffic in the virtual network based at least in part on selection of a switch that controls operability of the ping agent and the ping responder rule. The fourteenth aspect of the example system may be implemented in combination with the first, second, third, fourth, fifth, sixth, seventh, eighth, ninth, tenth, eleventh, twelfth, and/or thirteenth aspect of the example system, though the example embodiments are not limited in this respect.

In a fifteenth aspect of the example system, the one or more processors are configured to limit a rate at which the ping agent injects the first ping packets into the network traffic regardless of a rate at which the ping agent requests the first ping packets. The fifteenth aspect of the example system may be implemented in combination with the first, second, third, fourth, fifth, sixth, seventh, eighth, ninth, tenth, eleventh, twelfth, thirteenth, and/or fourteenth aspect of the example system, though the example embodiments are not limited in this respect.

In a sixteenth aspect of the example system, the ping agent is configured to randomize destination addresses to which the first ping packets are directed before the ping agent injects the first ping packets into the network traffic. The sixteenth aspect of the example system may be implemented in combination with the first, second, third, fourth, fifth, sixth, seventh, eighth, ninth, tenth, eleventh, twelfth, thirteenth, fourteenth, and/or fifteenth aspect of the example system, though the example embodiments are not limited in this respect.

In a seventeenth aspect of the example system, a first ping packet and another packet in the network traffic share a common source address, a common destination address, a common source port, a common destination port, and a common protocol. In accordance with the seventeenth aspect, the ping agent is configured to disallow the first ping packet from interrupting the other packet. In further accordance with the seventeenth aspect, the ping agent is configured to enable the other packet to be created despite the designated first ping packet and the other packet sharing the common source address, the common destination address, the common source port, the common destination port, and the common protocol. The seventeenth aspect of the example system may be implemented in combination with the first, second, third, fourth, fifth, sixth, seventh, eighth, ninth, tenth, eleventh, twelfth, thirteenth, fourteenth, fifteenth, and/or sixteenth aspect of the example system, though the example embodiments are not limited in this respect.

In an eighteenth aspect of the example system, the ping agent is configured to periodically query the virtual switch to determine destination addresses for packets that are provided via a virtual NIC port, the ping agent further configured to provide ping packets to the destination addresses using random source and destination ports to avoid collisions between the ping packets and other network traffic. The eighteenth aspect of the example system may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the example system, though the example embodiments are not limited in this respect.

In a nineteenth aspect of the example system, the one or more processors enable a user of the virtual network to prioritize subnets of the virtual network for which to monitor connectivity and latency. The nineteenth aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the example system, though the example embodiments are not limited in this respect.

In a twentieth aspect of the example system, the ping agent is configured to select one random destination address to which a first ping packet is to be sent for each peered virtual network. The twentieth aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the example system, though the example embodiments are not limited in this respect.

In a twenty-first aspect of the example system, the one or more processors are configured to modify the outbound packet filter rules to cause the first ping packets to not be processed by user-defined routes (UDRs). The twenty-first aspect of the example system may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, and/or twentieth aspect of the example system, though the example embodiments are not limited in this respect.

In an example method of monitoring connectivity and latency of a virtual network, first ping packets are injected into network traffic by a ping agent on behalf of one or more hosts in the virtual network. Incoming packets are monitored by the ping agent to identify first ping response packets, which are in response to the first ping packets, among the incoming packets. Second ping packets are intercepted in the network traffic by a ping responder rule that is included in inbound packet filter rules for a port in a virtual switch. The second ping packets are converted into second ping response packets and the second ping response packets are injected into outbound packet filter rules by the ping responder rule to be transferred to sources from which the second ping packets are received.

In a first aspect of the example method, the ping agent executes externally from the one or more hosts in the virtual network.

In a first example of the first aspect, the ping agent executes on a physical server that hosts a hypervisor for the one or more hosts in the virtual network.

In a second example of the first aspect, the ping agent executes on a switch that provides virtual network isolation for physical hosts that participate in a virtual network and that do not run in a hypervisor.

In a second aspect of the example method, each of the second ping packets specifies a source address from which the respective second ping packet is received, a destination address to which the respective second ping packet is to be provided, a name of a source port from which the respective second ping packet is received, and a name of a destination port to which the respective second ping packet is to be provided. In accordance with the second aspect, converting the second ping packets into the second ping response packets comprises swapping the source address and the destination address and swapping the name of the source port and the name of the destination port from each second ping packet to generate the respective second ping response packet. The second aspect of the example method may be implemented in combination with the first aspect of the example method, though the example embodiments are not limited in this respect.

In an example of the second aspect, converting the second ping packets into the second ping response packets comprises: adding a response packet flag to each second ping response packet.

In a third aspect of the example method, the example method further comprises distinguishing the second ping packets from other packets in the network traffic by the ping responder rule based at least in part on each second ping packet having a pre-defined TCP option code and a pre-defined number in an options header of the respective second ping packet. The third aspect of the example method may be implemented in combination with the first and/or second aspect of the example method, though the example embodiments are not limited in this respect.

In a fourth aspect of the example method, the example method further comprises determining, by the ping agent, a round-trip time associated with each first ping packet for which the ping agent receives the corresponding first ping response packet. In accordance with the fourth aspect, the round-trip time is equal to a difference between a send time instance at which the ping agent injects the respective first ping packet into the network traffic and a receipt time instance at which the ping agent receives the corresponding first ping response packet. The fourth aspect of the example method may be implemented in combination with the first, second, and/or third aspect of the example method, though the example embodiments are not limited in this respect.

In a first example of the fourth aspect, the example method further comprises generating an alert by a monitoring and alerting system based at least in part on one or more round-trip times associated with one or more respective first ping packets for which the ping agent receives the corresponding one or more first ping response packets being greater than or equal to a threshold time.

In a second example of the fourth aspect, the example method further comprises aggregating, by a monitoring and alerting system, information regarding one or more first hosts to which the first ping packets are directed and one or more second hosts to which the corresponding first ping response packets are directed. In accordance with the second example of the fourth aspect, the example method further comprises automatically performing at least one of the following operations by the monitoring and alerting system based at least in part on the aggregated information and further based at least in part on one or more round-trip times associated with one or more respective first ping packets for which the ping agent receives the corresponding one or more first ping response packets being greater than or equal to a threshold time: stopping at least one of software development or a configuration change on at least one of (a) one or more clusters of nodes or (b) one or more nodes in a cluster, based at least in part on the one or more first hosts and the one or more second hosts being included in the at least one of the one or more clusters or the one or more nodes; migrating hosts associated with the one or more first ping packets to one or more clusters or one or more nodes that include none of the first one or more hosts and none of the one or more second hosts; throttling network traffic having a priority that is less than a threshold priority; activating standby networking devices.

In an implementation of the second example of the fourth aspect, the aggregated information indicates a scope of a failure of the virtual network.

In a fifth aspect of the example method, the example method further comprises indicating, by the ping agent, a ping timeout error for each first ping packet for which the ping agent does not receive the corresponding first ping response packet. In accordance with the fifth aspect, the example method further comprises generating an alert by a monitoring and alerting system based at least in part on a number of ping timeout errors being greater than or equal to an error threshold. The fifth aspect of the example method may be implemented in combination with the first, second, third, and/or fourth aspect of the example method, though the example embodiments are not limited in this respect.

In a sixth aspect of the example method, the example method further comprises indicating, by the ping agent, a ping timeout error for each first ping packet for which the ping agent does not receive the corresponding first ping response packet. In accordance with the sixth aspect, the example method further comprises aggregating, by a monitoring and alerting system, information regarding one or more source hosts and one or more destination hosts for the first ping packets for which the ping agent does not receive the corresponding first ping response packets. In further accordance with the sixth aspect, the example method further comprises automatically performing at least one of the following operations by the monitoring and alerting system based at least in part on the aggregated information and further based at least in part on a number of ping timeout errors being greater than or equal to an error threshold: stopping at least one of software development or a configuration change on at least one of (a) one or more clusters of nodes or (b) one or more nodes in a cluster, based at least in part on the one or more source hosts and the one or more destination hosts being included in the at least one of the one or more clusters or the one or more nodes; migrating the one or more source hosts and the one or more destination hosts to one or more clusters or one or more nodes having fewer ping timeout errors than one or more clusters or one or more nodes from which the one or more source hosts and the one or more destination hosts are migrated; throttling network traffic having a priority that is less than a threshold priority; activating standby networking devices. The sixth aspect of the example method may be implemented in combination with the first, second, third, fourth, and/or fifth aspect of the example method, though the example embodiments are not limited in this respect.

In an example of the sixth aspect, the aggregated information indicates a scope of a failure of the virtual network.

In a seventh aspect of the example method, the inbound packet filter rules include a metering rule, an access control list (ACL) rule, and the ping responder rule. In accordance with the seventh aspect, intercepting the second ping packets in the network traffic comprises inhibiting, by the ping responder rule, the second ping packets from being processed by the metering rule and the access control rule. The seventh aspect of the example method may be implemented in combination with the first, second, third, fourth, fifth, and/or sixth aspect of the example method, though the example embodiments are not limited in this respect.

In an eighth aspect of the example method, the outbound packet filter rules include a metering rule and an access control list (ACL) rule. In accordance with the eighth aspect, injecting the first ping packets into the network traffic comprises injecting the first ping packets into the network traffic by the ping agent without passing the first ping packets through the metering rule and without passing the first ping packets through the access control list rule. The eighth aspect of the example method may be implemented in combination with the first, second, third, fourth, fifth, sixth, and/or seventh aspect of the example method, though the example embodiments are not limited in this respect.

In a ninth aspect of the example method, the outbound packet filter rules include a metering rule and an access control list (ACL) rule. In accordance with the ninth aspect, injecting the second ping response packets into the outbound packet filter rules comprises injecting the second ping response packets into the outbound packet filter rules by the ping responder rule without passing the second ping response packets through the metering rule and without passing the second ping response packets through the access control list rule. The ninth aspect of the example method may be implemented in combination with the first, second, third, fourth, fifth, sixth, seventh, and/or eighth aspect of the example method, though the example embodiments are not limited in this respect.

In a tenth aspect of the example method, the outbound packet filter rules include a metering rule and an access control list (ACL) rule. In accordance with the tenth aspect, the metering rule and the access control list rule ignore the first ping packets and the second ping response packets. The tenth aspect of the example method may be implemented in combination with the first, second, third, fourth, fifth, sixth, seventh, eighth, and/or ninth aspect of the example method, though the example embodiments are not limited in this respect.

In an eleventh aspect of the example method, the outbound packet filter rules include a ping spoof block rule. In accordance with the eleventh aspect, the ping spoof block rule ignores the first ping packets and the second ping response packets. The eleventh aspect of the example method may be implemented in combination with the first, second, third, fourth, fifth, sixth, seventh, eighth, ninth, and/or tenth aspect of the example method, though the example embodiments are not limited in this respect.

In a twelfth aspect of the example method, each second ping packet is identifiable as a ping packet based at least in part on the respective second ping packet having a TCP SYN header. In accordance with the twelfth aspect, each second ping response packet is identifiable as a ping response packet based at least in part on the respective ping response packet having a TCP SYN-ACK header. The twelfth aspect of the example method may be implemented in combination with the first, second, third, fourth, fifth, sixth, seventh, eighth, ninth, tenth, and/or eleventh aspect of the example method, though the example embodiments are not limited in this respect.

In a thirteenth aspect of the example method, the example method further comprises providing, by the ping agent, a TCP RST packet to one or more destination hosts associated with the first ping packets, the TCP RST packet indicating that resources allocated to the first ping packets are to be released. The thirteenth aspect of the example method may be implemented in combination with the first, second, third, fourth, fifth, sixth, seventh, eighth, ninth, tenth, eleventh, and/or twelfth aspect of the example method, though the example embodiments are not limited in this respect.

In a fourteenth aspect of the example method, the example method further comprises disabling the ping agent and the ping responder rule without interfering with other network traffic in the virtual network based at least in part on selection of a switch that controls operability of the ping agent and the ping responder rule. The fourteenth aspect of the example method may be implemented in combination with the first, second, third, fourth, fifth, sixth, seventh, eighth, ninth, tenth, eleventh, twelfth, and/or thirteenth aspect of the example method, though the example embodiments are not limited in this respect.

In a fifteenth aspect of the example method, the example method further comprises limiting a rate at which the ping agent injects the first ping packets into the network traffic regardless of a rate at which the ping agent requests the first ping packets. The fifteenth aspect of the example method may be implemented in combination with the first, second, third, fourth, fifth, sixth, seventh, eighth, ninth, tenth, eleventh, twelfth, thirteenth, and/or fourteenth aspect of the example method, though the example embodiments are not limited in this respect.

In a sixteenth aspect of the example method, the example method further comprises randomizing, by the ping agent, destination addresses to which the first ping packets are directed before the ping agent injects the first ping packets into the network traffic. The sixteenth aspect of the example method may be implemented in combination with the first, second, third, fourth, fifth, sixth, seventh, eighth, ninth, tenth, eleventh, twelfth, thirteenth, fourteenth, and/or fifteenth aspect of the example method, though the example embodiments are not limited in this respect.

In a seventeenth aspect of the example method, a first ping packet and an other packet in the network traffic share a common source address, a common destination address, a common source port, a common destination port, and a common protocol. In accordance with the seventeenth aspect, the example method further comprises at least one of: disallowing, by the ping agent, the first ping packet from interrupting the other packet; enabling, by the ping agent, the other packet to be created despite the designated first ping packet and the other packet sharing the common source address, the common destination address, the common source port, the common destination port, and the common protocol. The seventeenth aspect of the example method may be implemented in combination with the first, second, third, fourth, fifth, sixth, seventh, eighth, ninth, tenth, eleventh, twelfth, thirteenth, fourteenth, fifteenth, and/or sixteenth aspect of the example method, though the example embodiments are not limited in this respect.

In an eighteenth aspect of the example method, the example method further comprises periodically querying the virtual switch by the ping agent to determine destination addresses for packets that are provided via a virtual NIC port. In accordance with the eighteenth aspect, the example method further comprises providing ping packets to the destination addresses using random source and destination ports by the ping agent to avoid collisions between the ping packets and other network traffic. The eighteenth aspect of the example method may be implemented in combination with the first, second, third, fourth, fifth, sixth, seventh, eighth, ninth, tenth, eleventh, twelfth, thirteenth, fourteenth, fifteenth, sixteenth, and/or seventeenth aspect of the example method, though the example embodiments are not limited in this respect.

In a nineteenth aspect of the example method, the example method further comprises enabling a user of the virtual network to prioritize subnets of the virtual network for which to monitor connectivity and latency. The nineteenth aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, and/or eighteenth aspect of the example method, though the example embodiments are not limited in this respect.

In a twentieth aspect of the example method, the example method further comprises selecting, by the ping agent, one random destination address to which a first ping packet is to be sent for each peered virtual network. The twentieth aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, and/or nineteenth aspect of the example method, though the example embodiments are not limited in this respect.

In a twenty-first aspect of the example method, the example method further comprises modifying the outbound packet filter rules to cause the first ping packets to not be processed by user-defined routes (UDRs). The twenty-first aspect of the example method may be implemented in combination with the first, second, third, fourth, fifth, sixth, seventh, eighth, ninth, tenth, eleventh, twelfth, thirteenth, fourteenth, fifteenth, sixteenth, seventeenth, eighteenth, nineteenth, and/or twentieth aspect of the example method, though the example embodiments are not limited in this respect.

An example computer program product comprises a computer-readable storage medium having instructions recorded thereon for enabling a processor-based system to perform operations to monitor connectivity and latency of a virtual network. The operations comprise inject first ping packets into network traffic by a ping agent on behalf of one or more hosts in the virtual network. The operations further comprise monitor incoming packets by the ping agent to identify first ping response packets, which are in response to the first ping packets, among the incoming packets. The operations further comprise intercept second ping packets in the network traffic by a ping responder rule that is included in inbound packet filter rules for a port in a virtual switch. The operations further comprise convert the second ping packets into second ping response packets and injecting the second ping response packets into outbound packet filter rules by the ping responder rule to be transferred to sources from which the second ping packets are received.

IV. Example Computer System

Figure 8:
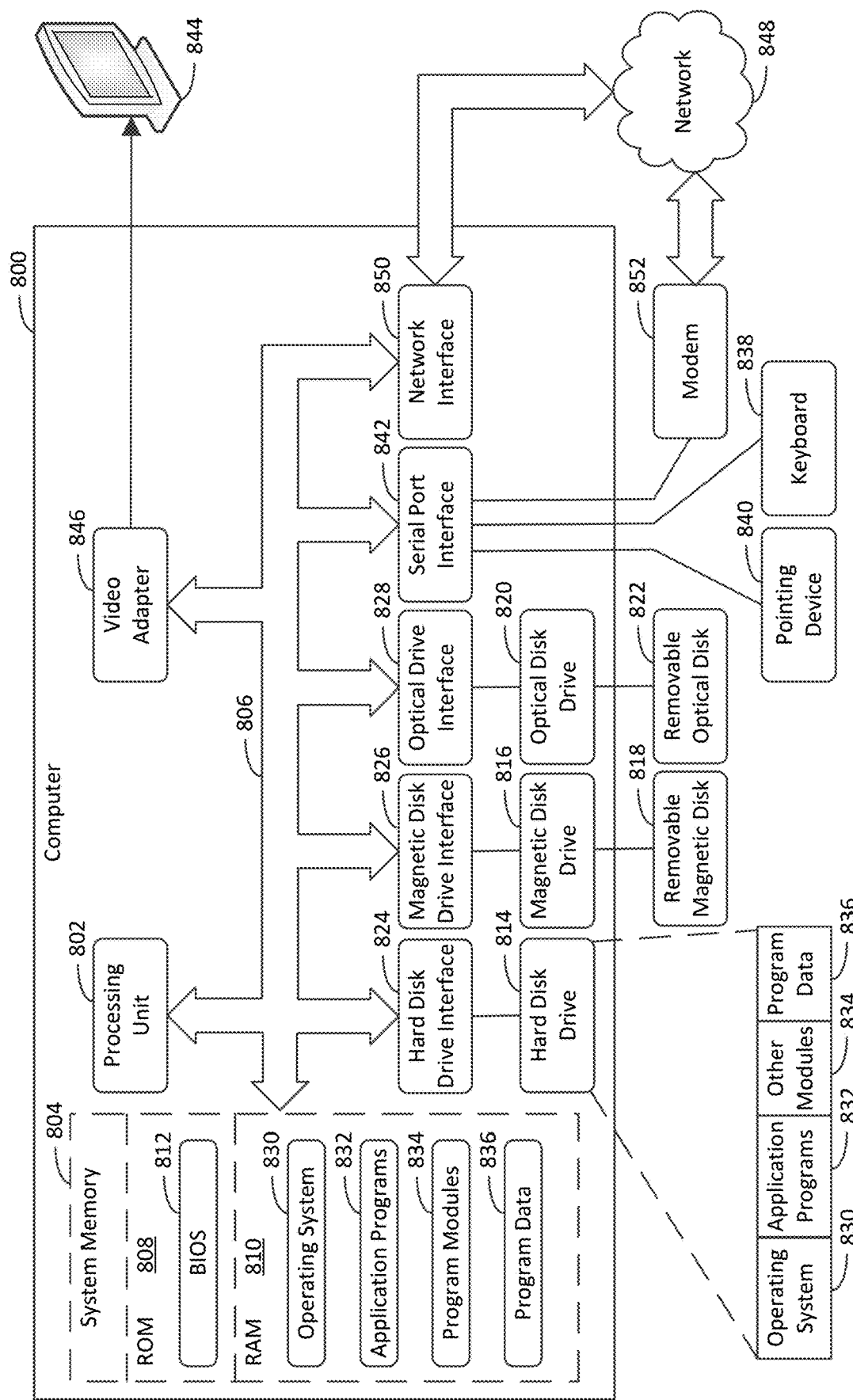
FIG. 8 depicts an example computer in which embodiments may be implemented.

FIG. 8 depicts an example computer 800 in which embodiments may be implemented. Any one or more of user systems 102A-102M and/or any one or more of servers 106A-106N shown in FIG. 1; and/or first physical host 206A, second physical host 206B, and/or monitoring and alerting system 238 shown in FIG. 2 may be implemented using computer 800, including one or more features of computer 800 and/or alternative features. Computer 800 may be a general-purpose computing device in the form of a conventional personal computer, a mobile computer, or a workstation, for example, or computer 800 may be a special purpose computing device. The description of computer 800 provided herein is provided for purposes of illustration, and is not intended to be limiting. Embodiments may be implemented in further types of computer systems, as would be known to persons skilled in the relevant art(s).

As shown in FIG. 8, computer 800 includes a processing unit 802, a system memory 804, and a bus 806 that couples various system components including system memory 804 to processing unit 802. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random access memory (RAM) 810. A basic input/output system 812 (BIOS) is stored in ROM 808.

Computer 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 830, one or more application programs 832, other program modules 834, and program data 836. Application programs 832 or program modules 834 may include, for example, computer program logic for implementing any one or more of connectivity and latency logic 108, ping agent(s) 110, ping responder rule(s) 112, first ping agent 210A, first virtual machine 214A, first virtual NIC 216A, first virtual switch 218A, outbound rules 220A, inbound rules 222A, metering rules 224A, ACL rules 226A, ping spoof block rule 228A, CA-to-PA map rule 230A, NVGRE encapsulation rule 232A, metering rules 234A, ACL rules 236A, ping responder rule 212A, NVGRE encapsulation rule 242A, control logic 244A, second ping agent 210B, second virtual machine 214B, second virtual NIC 216B, second virtual switch 218B, outbound rules 220B, inbound rules 222B, metering rules 224B, ACL rules 226B, ping spoof block rule 228B, CA-to-PA map rule 230B, NVGRE encapsulation rule 232B, metering rules 234B, ACL rules 236B, ping responder rule 212B, NVGRE encapsulation rule 242B, control logic 244B, flowchart 500 (including any step of flowchart 500), flowchart 600 (including any step of flowchart 600), and/or flowchart 700 (including any step of flowchart 700), as described herein.

A user may enter commands and information into the computer 800 through input devices such as keyboard 838 and pointing device 840. Other input devices (not shown) may include a microphone, joystick, game pad, satellite dish, scanner, touch screen, camera, accelerometer, gyroscope, or the like. These and other input devices are often connected to the processing unit 802 through a serial port interface 842 that is coupled to bus 806, but may be connected by other interfaces, such as a parallel port, game port, or a universal serial bus (USB).

A display device 844 (e.g., a monitor) is also connected to bus 806 via an interface, such as a video adapter 846. In addition to display device 844, computer 800 may include other peripheral output devices (not shown) such as speakers and printers.

Computer 800 is connected to a network 848 (e.g., the Internet) through a network interface or adapter 850, a modem 852, or other means for establishing communications over the network. Modem 852, which may be internal or external, is connected to bus 806 via serial port interface 842.

As used herein, the terms "computer program medium" and "computer-readable storage medium" are used to generally refer to media (e.g., non-transitory media) such as the hard disk associated with hard disk drive 814, removable magnetic disk 818, removable optical disk 822, as well as other media such as flash memory cards, digital video disks, random access memories (RAMs), read only memories (ROM), and the like. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 832 and other program modules 834) may be stored on the hard disk, magnetic disk, optical disk, ROM, or RAM. Such computer programs may also be received via network interface 850 or serial port interface 842. Such computer programs, when executed or loaded by an application, enable computer 800 to implement features of embodiments discussed herein. Accordingly, such computer programs represent controllers of the computer 800.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

V. Conclusion

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   a memory; and
   one or more processors coupled to the memory, the memory storing thereon computer-readable instructions that, when executed by the one or more processors, cause the system to perform operations comprising:

inject, outside of a source virtual machine in a virtual network, ping packets into a network on behalf of a source virtual machine, the ping packets having a source virtual address of the source virtual machine and a destination virtual address of a destination virtual machine;

route the ping packets to the destination virtual machine based on the destination virtual address;

intercept the ping packets at a destination virtual port before arrival at the destination virtual machine in the virtual network;

convert the ping packets into ping response packets, wherein the ping packets are converted outside of the destination virtual machine;

inject, outside of the destination virtual machine, the ping response packets into the network on behalf of the destination virtual machine; and route the ping response packets to the source virtual machine based on the source virtual address.

2. The system of claim 1, wherein each of the ping packets specifies a source address from which the respective ping packet is received, a destination address to which the respective ping packet is to be provided, a name of a source port from which the respective ping packet is received, and a name of a destination port to which the respective ping packet is to be provided;

further comprising computer-readable instructions that, when executed by the one or more processors, cause the system to perform operations comprising:

convert the ping packets into the ping response packets by swapping the source address and the destination address and by swapping the name of the source port and the name of the destination port from each ping packet to generate the respective ping response packet.

3. The system of claim 1, further comprising computer-readable instructions that, when executed by the one or more processors, cause the system to perform operations comprising:

distinguish the ping packets from other packets in the network based at least in part on each ping packet having a pre-defined TCP option code and a pre-defined number in an options header of the respective ping packet.

4. The system of claim 1, further comprising computer-readable instructions that, when executed by the one or more processors, cause the system to perform operations comprising:

determine a round-trip time associated with each ping packet for which a corresponding ping response packet is received, the round-trip time being equal to a difference between a send time instance at which the respective ping packet is injected into the network and a receipt time instance at which the corresponding ping response packet is received.

5. The system of claim 4, further comprising computer-readable instructions that, when executed by the one or more processors, cause the system to perform operations comprising:

generate an alert based at least in part on one or more round-trip times associated with one or more respective ping packets for which corresponding ping response packets are greater than or equal to a threshold time.

6. The system of claim 4, further comprising computer-readable instructions that, when executed by the one or more processors, cause the system to perform operations comprising:

aggregate information regarding one or more first hosts to which the ping packets are directed and one or more hosts to which the corresponding ping response packets are directed automatically perform at least one of the following operations based at least in part on the aggregated information and further based at least in part on one or more round-trip times associated with one or more first ping packets for which corresponding ping response packets are greater than or equal to a threshold time:

stop at least one of software development or a configuration change on at least one of one or more clusters of nodes or one or more nodes in a cluster, based at least in part on the one or more first hosts and the one or more second hosts being included in the at least one of the one or more clusters or the one or more nodes;

migrate hosts associated with the one or more ping packets to one or more clusters or one or more nodes that include none of the one or more first hosts and none of the one or more second hosts;

throttle network traffic having a priority that is less than a threshold priority; and activate standby networking devices.

7. The system of claim 1, further comprising computer-readable instructions that, when executed by the one or more processors, cause the system to perform operations comprising:

indicate a ping timeout error for each ping packet for which a corresponding ping response packet is not received; and generate an alert based at least in part on a number of ping timeout errors being greater than or equal to an error threshold.

8. The system of claim 1, further comprising computer-readable instructions that, when executed by the one or more processors, cause the system to perform operations comprising:

indicate a ping timeout error for each ping packet for a corresponding first ping response packet that is not received; and aggregate information regarding one or more source hosts and one or more destination hosts for the ping packets for the corresponding ping response packets that are not received, automatically perform at least one of the following operations based at least in part on the aggregated information and further based at least in part on a number of ping timeout errors being greater than or equal to an error threshold:

stop at least one of software development or a configuration change on at least one of one or more clusters of nodes or one or more nodes in a cluster, based at least in part on the one or more source hosts and the one or more destination hosts being included in the at least one of the one or more clusters or the one or more nodes;

migrate the one or more source hosts and the one or more destination hosts to one or more clusters or one or more nodes having fewer ping timeout errors than one or more clusters or one or more nodes from which the one or more source hosts and the one or more destination hosts are migrated;

throttle network traffic having a priority that is less than a threshold priority; and activate standby networking devices.

9. The system of claim 1,
further comprising computer-readable instructions that, when executed by the one or more processors, cause the system to perform operations comprising:
inhibit the ping packets from being processed by a metering rule and an access control rule by intercepting the ping packets.

10. The system of claim 1, further comprising computer-readable instructions that, when executed by the one or more processors, cause the system to perform operations comprising:
inject the ping packets into the network without passing the ping packets through a metering rule and without passing the ping packets through an access control list rule.

11. The system of claim 1 further comprising computer-readable instructions that, when executed by the one or more processors, cause the system to perform operations comprising:
inject the ping response packets without passing the ping response packets through a metering rule and without passing the ping response packets through an access control list rule.

12. The system of claim 1, further comprising computer-readable instructions that, when executed by the one or more processors, cause the system to perform operations comprising:
ignore the ping packets and the ping response packets.

13. The system of claim 1, wherein one or more of the operations can be disabled without interfering with other network traffic in the virtual network based at least in part on selection of a switch.

14. The system of claim 1, wherein the ping packet and another packet in the network traffic share a common source address, a common destination address, a common source port, a common destination port, and a common protocol;
further comprising computer-readable instructions that, when executed by the one or more processors, cause the system to perform operations comprising:
ping packet from interrupting the other packet; and
enable the other packet to be created.

15. The system of claim 1, further comprising computer-readable instructions that, when executed by the one or more processors, cause the system to perform operations comprising:
query the virtual switch to determine destination addresses for packets that are provided via a virtual NIC port,
provide ping packets to the destination addresses using random source and destination ports to avoid collisions between the ping packets and other network traffic.

16. A method of monitoring connectivity and latency of a virtual network, the method comprising:
injecting ping packets into network traffic on behalf of a source virtual machine in the virtual network, the ping packets having a source virtual address of the source virtual machine and a destination virtual address of a destination virtual machine, the ping packets injected outside of the source virtual machine;
intercepting the ping packets at a destination virtual port in the network traffic before arrival at the destination virtual machine in the virtual network; and
converting the ping packets into ping response packets, wherein the ping packets are converted outside of the destination virtual machine;
injecting, outside of the destination virtual machine, the ping response packets into the network on behalf of the destination virtual machine; and
routing the ping response packets to the source virtual machine based on the source virtual address.

17. The method of claim 16, wherein each ping packet is identifiable based at least in part on the ping packet having a TCP SYN header; and
wherein each ping response packet is identifiable based at least in part on the ping response packet having a TCP SYN-ACK header.

18. The method of claim 16, further comprising:
providing a TCP RST packet to one or more destination hosts associated with the ping packets, the TCP RST packet indicating that resources allocated to the ping packets are to be released.

19. The method of claim 16, further comprising:
limiting a rate at which ping packets are injected into the network traffic.

20. The method of claim 16, further comprising:
randomizing destination addresses to which the ping packets are directed before injecting the ping packets into the network traffic.

21. The method of claim 16, further comprising:
enabling a user of the virtual network to prioritize subnets of the virtual network for which to monitor connectivity and latency.

22. The method of claim 16, further comprising:
selecting one random destination address to which a ping packet is to be sent for each peered virtual network.

23. The method of claim 16, further comprising:
causing the ping packets to not be processed by user-defined routes (UDRs).

24. A computer-readable storage medium having instructions recorded thereon for enabling a processor-based system to perform operations to monitor connectivity and latency of a virtual network, the operations comprising;
inject ping packets into network traffic on behalf of a source virtual machine in the virtual network, the ping packets having a source virtual address of the source virtual machine and a destination virtual address of a destination virtual machine, the ping packets injected outside of the source virtual machine;
intercept the ping packets at a destination virtual port before arrival at the destination virtual machine in the virtual network; and
convert the ping packets into ping response packets, wherein the ping packets are converted outside of the destination virtual machine;
injecting, outside of the destination virtual machine, the ping response packets into the network on behalf of the destination virtual machine; and
route the ping response packets to the source virtual machine based on the source virtual address.

* * * * *